US011460209B2

(12) United States Patent
Lupien et al.

(10) Patent No.: US 11,460,209 B2
(45) Date of Patent: Oct. 4, 2022

(54) ENVIRONMENT CONTROLLER AND METHOD FOR GENERATING A PREDICTIVE MODEL OF A NEURAL NETWORK THROUGH DISTRIBUTED REINFORCEMENT LEARNING

(71) Applicant: Distech Controls Inc., Brossard (CA)

(72) Inventors: Steve Lupien, Boucherville (CA); Francois Gervais, Lachine (CA)

(73) Assignee: Distech Controls Inc., Brossard (CA)

( * ) Notice: Subject to any disclaimer, the term of this patent is extended or adjusted under 35 U.S.C. 154(b) by 489 days.

(21) Appl. No.: 16/697,886

(22) Filed: Nov. 27, 2019

(65) Prior Publication Data

US 2021/0063041 A1     Mar. 4, 2021

Related U.S. Application Data

(60) Provisional application No. 62/891,585, filed on Aug. 26, 2019.

(51) Int. Cl.
    *G06N 3/08*       (2006.01)
    *F24F 11/63*     (2018.01)
    (Continued)

(52) U.S. Cl.
    CPC ............ *F24F 11/63* (2018.01); *F24F 11/745* (2018.01); *F24F 11/84* (2018.01); *F24F 11/86* (2018.01);
    (Continued)

(58) Field of Classification Search
    USPC ................ 705/35, 39, 38; 700/291; 236/47; 719/238; 717/108
    See application file for complete search history.

(56) References Cited

U.S. PATENT DOCUMENTS

| 8,457,796 B2* | 6/2013 | Thind | G05B 15/02 236/47 |
| 2010/0088261 A1* | 4/2010 | Montalvo | H02J 3/144 700/297 |

(Continued)

FOREIGN PATENT DOCUMENTS

EP      3480741 A1     5/2019

OTHER PUBLICATIONS

Energy Efficient Smart Working Environment Using Internet of Things; 2019 IEEE 89th Vehicular Technology Conference (VTC2019—Spring) (pp. 1-5); Vikash, Lalita Mishra, Sajan D. Chouhan, Shirshu Varma; Apr. 28, 2019.. (Year: 2019).*

(Continued)

*Primary Examiner* — Tien C Nguyen
(74) *Attorney, Agent, or Firm* — RatnerPrestia

(57) ABSTRACT

Interactions between a training server and a plurality of environment controllers are used for updating the weights of a predictive model used by a neural network executed by the plurality of environment controllers. Each environment controller executes the neural network using a current version of the predictive model to generate outputs based on inputs, modifies the outputs, and generates metrics representative of the effectiveness of the modified outputs for controlling the environment. The training server collects the inputs, the corresponding modified outputs, and the corresponding metrics from the plurality of environment controllers. The collected inputs, modified outputs and metrics are used by the training server for updating the weights of the current predictive model through reinforcement learning. A new predictive model comprising the updated weights is transmitted to the environment controllers to be used in place of the current predictive model.

36 Claims, 11 Drawing Sheets

(51) Int. Cl.
  *F24F 11/84*    (2018.01)
  *F24F 11/86*    (2018.01)
  *F24F 11/74*    (2018.01)
  *G06N 5/04*    (2006.01)
  *F24F 110/20*    (2018.01)
  *F24F 140/10*    (2018.01)
  *F24F 110/10*    (2018.01)

(52) U.S. Cl.
  CPC .............. *G06N 3/08* (2013.01); *G06N 5/04* (2013.01); *F24F 2110/10* (2018.01); *F24F 2110/20* (2018.01); *F24F 2140/10* (2018.01)

(56) References Cited

U.S. PATENT DOCUMENTS

| | | | |
|---|---|---|---|
| 2013/0013121 A1* | 1/2013 | Henze ................... | G06Q 10/04 |
| | | | 700/291 |
| 2014/0277765 A1 | 9/2014 | Karimi et al. | |
| 2018/0306459 A1* | 10/2018 | Turney ................... | F24F 11/63 |
| 2019/0126472 A1* | 5/2019 | Tunyasuvunakool ... | G06N 3/08 |
| 2019/0179269 A1 | 6/2019 | Gervais et al. | |

OTHER PUBLICATIONS

Extended European Search Report for European Application No. 20 192 184.8, dated Jan. 12, 2021, 9 pages.

* cited by examiner

ENVIRONMENT CONTROLLER AND METHOD FOR GENERATING A PREDICTIVE MODEL OF A NEURAL NETWORK THROUGH DISTRIBUTED REINFORCEMENT LEARNING

CROSS-REFERENCE TO RELATED APPLICATIONS

This application claims priority to U.S. Provisional Patent Application No. 62/891,585, filed Aug. 26, 2019, titled "TRAINING SERVER AND ENVIRONMENT CONTROLLERS FOR GENERATING A PREDICTIVE MODEL OF A NEURAL NETWORK THROUGH REINFORCEMENT LEARNING," the disclosure of which is incorporated herein by reference in its entirety for all purposes.

TECHNICAL FIELD

The present disclosure relates to the field of environmental control through building automation. More specifically, the present disclosure presents an environment controller and a method for generating a predictive model of a neural network through distributed reinforcement learning.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from sensors, and in turn determines set-points or command parameters to be sent to controlled appliances.

For instance, a room has current environmental characteristic values, such as a current temperature and a current humidity level, detected by sensors and reported to an environment controller. A user interacts with the environment controller to provide set point(s), such as a target temperature. The environment controller sends the current environmental characteristic values (e.g. current temperature and current humidity level) and the set point(s) (e.g. target temperature) to a controlled appliance. The controlled appliance generates commands for actuating internal components of the controlled appliance to reach the set point(s) based on the current environmental characteristic values. Alternatively, the environment controller directly determines command(s) based on the current environmental characteristic values and the set point(s), and transmits the command(s) to the controlled appliance. The controlled appliance uses the command(s) received from the environment controller to actuate the internal components.

Examples of controlled appliances include a heating, ventilating, and/or air-conditioning (HVAC) appliance, which regulates the temperature, humidity level and CO2 level in an area of a building. Examples of internal components include a motor, an electrical circuit (e.g. for generating heat), a valve (e.g. for controlling an air flow), etc.

Current advances in artificial intelligence, and more specifically in neural networks, can be taken advantage of in the context of building automation. More specifically, a predictive model comprising weights of a neural network is generated during a training phase and used during an operational phase. The neural network uses the predictive model to generate the command(s) for controlling the appliance based on the current environmental characteristic values, the set point(s), and optionally other parameters (e.g. characteristic(s) of an area of a building).

The generation of the predictive model during the training phase is a difficult task, which requires a lot of samples (inputs and outputs of the neural network being trained) for generating the predictive model. Automating the generation of samples for the training phase and allowing an improvement of the predictive model during the operational phase are ways of making the training process more efficient and potentially also more accurate.

Therefore, there is a need for an environment controller and a method for generating a predictive model of a neural network through distributed reinforcement learning.

SUMMARY

According to a first aspect, the present disclosure relates to an environment controller. The environment controller comprises at least one communication interface, memory for storing a predictive model comprising weights of a neural network, and a processing unit comprising one or more processor. The processing unit (a) determines at least one environmental characteristic value in an area. The processing unit (b) receives at least one set point via one of the at least one communication interface and a user interface of the environment controller. The processing unit (c) executes a neural network inference engine using the predictive model for generating one or more output based on inputs. The one or more output comprises one or more command for controlling a controlled appliance. The inputs comprise the at least one environmental characteristic value in the area and the at least one set point. The processing unit (d) modifies the one or more command and (e) transmits the one or more modified command to the controlled appliance via the at least one communication interface. The processing unit (f) generates at least one metric representative of an execution of the one or more modified command by the controlled appliance. The processing unit (g) transmits the inputs, the one or more output and the at least one metric to a training server via the at least one communication interface. The processing unit (h) receives an update of the predictive model comprising updated weights from the training server via the at least one communication interface.

According to a second aspect, the present disclosure relates to a method for improving a predictive model of a neural network used for performing environment control. The method comprises storing in a memory of a computing device a predictive model comprising weights of a neural network. The method comprises (a) determining, by a processing unit of the computing device, at least one environmental characteristic value in an area. The method comprises (b) receiving at least one set point via one of a communication interface of the computing device or a user interface of the computing device. The method comprises (c) executing, by the processing unit of the computing device, a neural network inference engine using the predictive model for generating one or more output based on inputs. The one or more output comprises one or more command for controlling a controlled appliance. The inputs comprise the at least one environmental characteristic value in the area and the at least one set point. The method comprises (d) modifying, by the processing unit of the computing device, the one or more command. The method comprises (e) transmitting the one or more modified command to the controlled appliance via the communication interface of the computing device. The method comprises (f) generating, by the processing unit of the computing device, at least one metric representative of an execution of the one or more modified command by the controlled appliance. The method comprises (g) transmitting the inputs, the one or more output and the at least one metric to a training server via the communication interface. The method comprises (h) receiving an update of the predictive model comprising updated weights from the training server via the communication interface.

According to a third aspect, the present disclosure relates to a non-transitory computer program product comprising instructions executable by a processing unit of a computing device. The execution of the instructions by the processing unit of the computing device provides for improving a predictive model of a neural network used for performing environment control, by implementing the aforementioned method.

In a particular aspect, steps (a) to (g) are repeated a plurality of times before the occurrence of step (h).

BRIEF DESCRIPTION OF THE DRAWINGS

Embodiments of the disclosure will be described by way of example only with reference to the accompanying drawings, in which.

DETAILED DESCRIPTION

Figure 1:
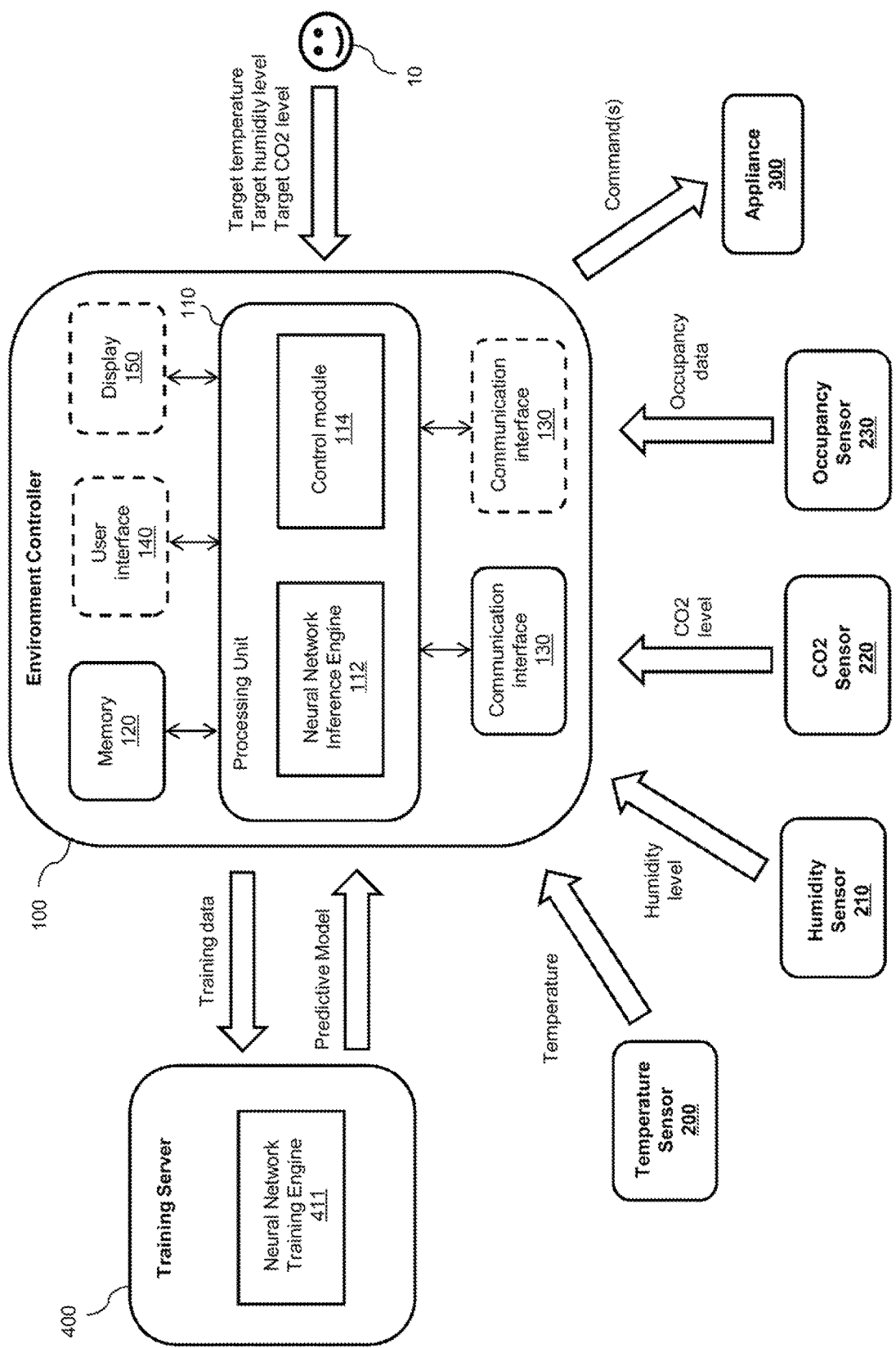
FIG. 1 illustrates an environment control system comprising an environment controller and a training server.

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for generating and improving a predictive model of a neural network used by a plurality of environment controllers. The generation and improvement is performed through the use of a training server interacting with the plurality of environment controllers and performing reinforcement learning.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, $CO_2$, flow, radiation, water level, speed, sound; a variation of at least one of the following, temperature, pressure, humidity and lighting, $CO_2$ levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: the expression 'area of a building' is used throughout the present specification to refer to the interior of a whole building or a portion of the interior of the building such as, without limitation: a floor, a room, an aisle, etc.

Figure 2:
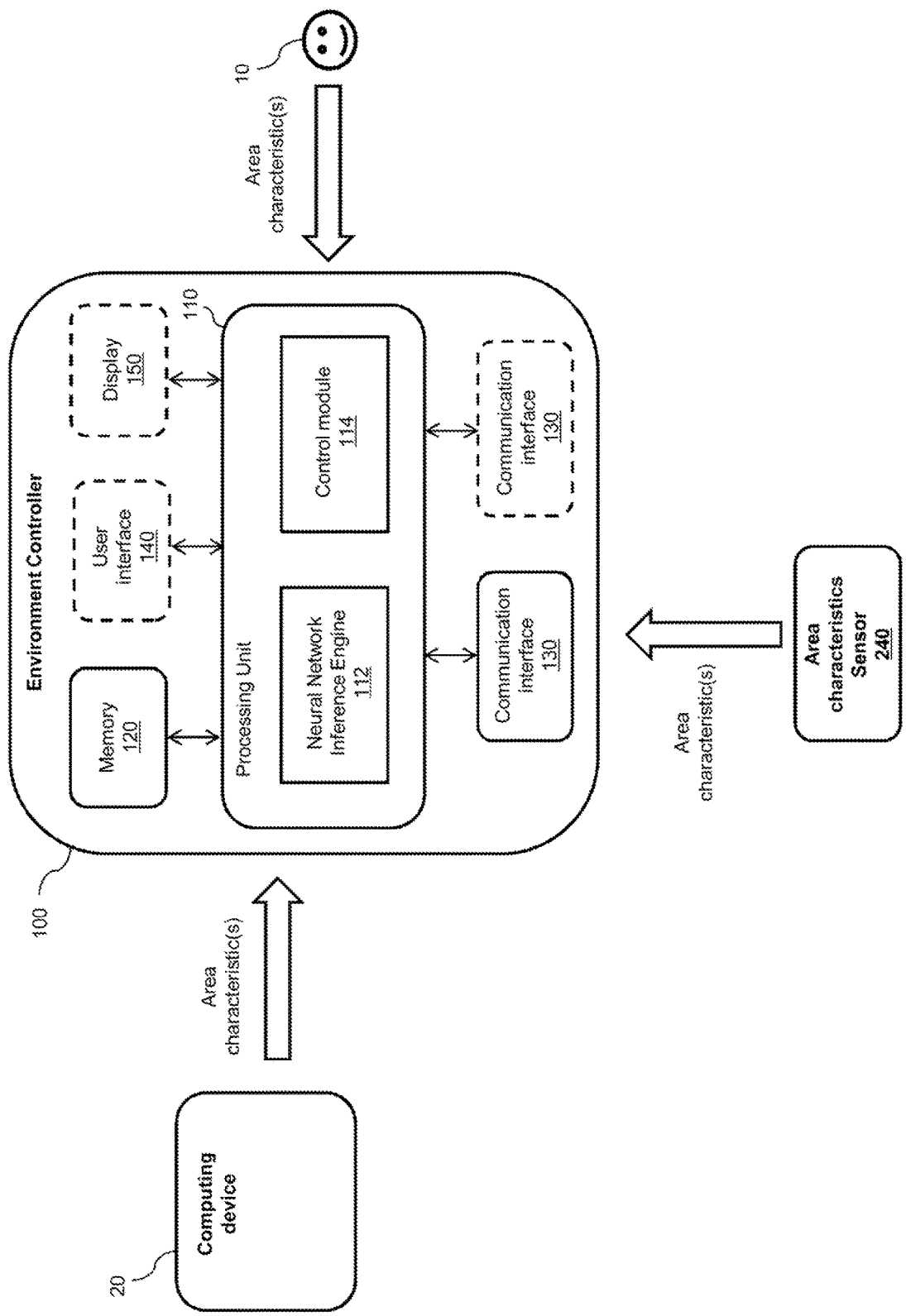
FIG. 2 further illustrates the environment control system of FIG. 1.

Referring now to FIGS. 1 and 2, an environment control system where an environment controller 100 exchanges data with other environment control devices (ECDs) is illustrated. The environment controller 100 is responsible for controlling the environment of an area of a building. The environment controller 100 receives from sensors (e.g. 200, 210, 220 and 230) environmental characteristic values measured by the sensors. The environment controller 100 generates commands based on the received environmental characteristic values. The generated commands are transmitted to controlled appliances 300 (to control the operations of the controlled appliances 300). Although a single controlled appliance 300 is represented in FIG. 1 for simplification purposes, the environment controller 100 may be interacting with a plurality of controlled appliances 300.

The area under the control of the environment controller 100 is not represented in the Figures for simplification purposes. As mentioned previously, the area may consist of a room, a floor, an aisle, etc. However, any type of area located inside any type of building is considered to be within the scope of the present disclosure. The sensors (200, 210, 220 and 230) and the controlled appliances 300 are generally located in the area under control (e.g. a room). The environment controller 100 may or may not be located in the area under control. For example, the environment controller 100 may remotely control the environment of the area under control, which includes controlling the controlled appliances 300 based on the inputs of the sensors 200, 210, 220 and 230.

Examples of sensors include: a temperature sensor 200 for measuring a temperature in the area and transmitting the measured temperature to the environment controller 100, a humidity sensor 210 for measuring a humidity level in the area and transmitting the measured humidity level to the environment controller 100, a CO2 sensor 220 for measuring a CO2 level in the area and transmitting the measured CO2 level to the environment controller 100, an occupancy sensor 230 for generating occupancy data for the area and transmitting the generated occupancy data to the environment controller 100, a lighting sensor (not represented in the Figures) for measuring a light level in the area and transmitting the measured light level to the environment controller 100, etc.

Each environmental characteristic value measured by a sensor may consist of either a single value (e.g. the current CO2 level measured by the CO2 sensor 210 is 405 parts per million), or a range of values (e.g. the current CO2 level measured by the CO2 sensor 210 is in the range of 400 to 410 parts per million).

In a first implementation, a single sensor (e.g. CO2 sensor 210) measures a given type of environmental characteristic value (e.g. CO2 level) for the whole area. In a second implementation, the area is divided into a plurality of zones, and a plurality of sensors (e.g. temperature sensors 200) measures the given type of environmental characteristic value (e.g. temperature) in the corresponding plurality of zones. In the second implementation, the environment controller 100 calculates an average environmental characteristic value in the area (e.g. an average temperature in the area) based on the environmental characteristic values transmitted by the plurality of sensors (e.g. temperature sensors 200) respectively located in the plurality of zones of the area.

Additional sensor(s) may be deployed outside of the area and report their measurement(s) to the environment controller 100. For example, the area is a room of a building. An external temperature sensor measures an external temperature outside the building and transmits the measured external temperature to the environment controller 100. Similarly, an external humidity sensor measures an external humidity level outside the building and transmits the measured external humidity level to the environment controller 100.

The aforementioned examples of sensors are for illustration purposes only. A person skilled in the art would readily understand that other types of sensors could be used in the context of the environment control system managed by the environment controller 100.

Each controlled appliance 300 comprises at least one actuation module, to control the operations of the controlled appliance 300 based on the commands received from the environment controller 100. The actuation module can be of one of the following types: mechanical, pneumatic, hydraulic, electrical, electronical, a combination thereof, etc. The commands control operations of the at least one actuation module.

An example of a controlled appliance 300 consists of a VAV appliance. Examples of commands transmitted to the VAV appliance include commands directed to one of the following: an actuation module controlling the speed of a fan, an actuation module controlling the pressure generated by a compressor, an actuation module controlling a valve defining the rate of an airflow, etc. This example is for illustration purposes only. Other types of controlled appliances 300 could be used in the context of an environment control system managed by the environment controller 100.

Details of the environment controller 100, sensors (200, 210, 220 and 230) and control appliance 300 will now be provided.

The environment controller 100 comprises a processing unit 110, memory 120, and a communication interface 130. The environment controller 100 may comprise additional components, such as another communication interface 130, a user interface 140, a display 150, etc.

The processing unit 110 comprises one or more processors (not represented in the Figures) capable of executing instructions of a computer program. Each processor may further comprise one or several cores. The processing unit 110 executes a neural network inference engine 112 and a control module 114, as will be detailed later in the description.

The memory 120 stores instructions of computer program(s) executed by the processing unit 110, data generated by the execution of the computer program(s), data received via the communication interface 130 (or another communication interface), etc. Only a single memory 120 is represented in FIG. 1, but the environment controller 100 may comprise several types of memories, including volatile memory (such as a volatile Random Access Memory (RAM), etc.) and non-volatile memory (such as a hard drive, electrically-erasable programmable read-only memory (EEPROM), flash, etc.).

The communication interface 130 allows the environment controller 100 to exchange data with remote devices (e.g. the sensors (200, 210, 220 and 230), the controlled appliance 300, etc.) over a communication network (not represented in FIG. 1 for simplification purposes). For example, the communication network is a wired communication network, such as an Ethernet network. The communication interface 130 is adapted to support communication protocols used to exchange data over the Ethernet network. Other types of wired communication networks may also be supported by the communication interface 130. In another example, the communication network is a wireless communication network, such as a Wi-Fi network. The communication interface 130 is adapted to support communication protocols used to exchange data over the Wi-Fi network. Other types of wireless communication network may also be supported by the communication interface 130, such as a wireless mesh network, Bluetooth®, Bluetooth® Low Energy (BLE), etc. In still another example, the environment controller 100 comprises two communication interfaces 130. The environment controller 100 communicates with the sensors (200, 210, 220 and 230) and the controlled appliance 300 via a first communication interface 130 (e.g. a Wi-Fi interface); and communicates with other devices (e.g. a training server 400) via a second communication interface 130 (e.g. an Ethernet interface). Each communication interface 130 usually comprises a combination of hardware and software executed by the hardware, for implementing the communication functionalities of the communication interface 130.

A detailed representation of the components of the sensors (e.g. temperature sensor 200) is not provided in FIG. 1 for simplification purposes. The sensor comprises at least one sensing module for detecting an environmental characteristic (e.g. temperature). The sensor further comprises a communication interface for transmitting to the environment controller 100 an environmental characteristic value (e.g. value of the temperature) corresponding to the detected environmental characteristic. The environmental characteristic value is transmitted over a communication network and received via the communication interface 130 of the environment controller 100. The sensor may also comprise a processing unit for generating the environmental characteristic value based on the detected environmental characteristic. Alternatively, the environmental characteristic value is directly generated by the sensing module. The other types of sensors mentioned previously (e.g. humidity sensor 210 and $CO_2$ sensor 220) generally include the same types of components as those mentioned for the temperature sensor 200.

The temperature, humidity and $CO_2$ sensors are well known in the art, and easy to implement types of sensors. With respect to the occupancy sensor, its implementation may be more or less complex, based on its capabilities. For example, a basic occupancy sensor (e.g. based on ultrasonic or infrared technology) is only capable of determining if the area is occupied or not. A more sophisticated occupancy sensor is capable of determining the number of persons present in the area, and may use a combination of camera(s) and pattern recognition software for this purpose. Alternatively, the occupancy sensor is not capable of determining the number of persons present in the area, but is capable of determining the number of persons entering or leaving the area (e.g. an infrared beam sensor using infrared rays to detect people entering or leaving the area).

A detailed representation of the components of the controlled appliance 300 is not provided in FIG. 1 for simplification purposes. As mentioned previously, the controlled appliance 300 comprises at least one actuation module. The controlled appliance 300 further comprises a communication interface for receiving commands from the environment controller 100. The commands control operations of the at least one actuation module. The commands are transmitted over a communication network via the communication interface 130 of the environment controller 100. The controlled appliance 300 may also comprise a processing unit for controlling the operations of the at least one actuation module based on the received commands.

A detailed representation of the components of the training server 400 is not provided in FIG. 1 as it will be detailed later. The training server 400 comprises a processing unit, memory and a communication interface. The processing unit of the training server 400 executes a neural network training engine 411.

The execution of the neural network training engine 411 generates a predictive model, which is transmitted to the environment controller 100 via the communication interface of the training server 400. The predictive model is transmitted over a communication network and received via the communication interface 130 of the environment controller 100.

Also represented in FIG. 1 is a user 10. The user 10 provides at least one set point to the environment controller 100. Examples of set points include target environmental characteristic values, such as a target temperature, a target humidity level, a target $CO_2$ level, a combination thereof, etc. The at least one set point is related to the area where the sensors (200, 210, 220 and 230) and the controlled appliance 300 are located. Alternatively, the controlled appliance 300 is not located in the area, but the operations of the controlled appliance 300 under the supervision of the environment controller 100 aim at reaching the at least one set point in the area. The user 10 enters the at least one set point via the user interface 140 of the environment controller 100. Alternatively, the user 10 enters the at least one set point via a user interface of a computing device (e.g. a smartphone, a tablet, etc.) not represented in FIG. 1 for simplification purposes; and the at least one set point is transmitted over a communication network and received via the communication interface 130 of the environment controller 100.

The previous examples of setpoints are for illustration purposes only, and a person skilled in the art would readily understand that other types of set points could be used in the context of an environment control system managed by the environment controller 100. Furthermore, each set point may consist of either a single value (e.g. target temperature of 25 degrees Celsius), or a range of values (e.g. target temperature between 25 and 26 degrees Celsius).

Optionally, the control module 114 executed by the processing unit 110 of the environment controller 100 also determines at least one characteristic of the area.

The characteristic(s) of the area include one or more geometric characteristics of the area (e.g. a room in a building). Examples of geometric characteristics include a volume of the area, a surface of the area, a height of the area, a length of the area, a width of the area, etc. Instead of a given value, the geometric characteristics may be identified as ranges of values. For example, the volume of the area is defined by the following ranges of values: 0 to 50 cubic meters, 50 to 200 cubic meters, and more than 200 cubic meters. Similarly, the height of the area is defined by the following ranges of values: less than 3 meters and more than 3 meters.

Alternatively or complementarity, the characteristic(s) of the area include an area type identifier of the current area A plurality of area type identifiers is defined, each area type identifier corresponding to areas having one or more geometric characteristics in common. For example, each area type identifier is an alphanumerical value. The area type identifier of the current area is selected among the plurality of pre-defined area type identifiers based on geometric characteristics of the current area. For instance, the area type identifier R1 is allocated to areas having a volume lower than 50 cubic meters; the area type identifier R2 is allocated to areas having a volume between 50 and 200 cubic meters, and a height lower than 3 meters; the area type identifier R3 is allocated to areas having a volume between 50 and 200 cubic meters, and a height higher than 3 meters; and the area type identifier R4 is allocated to areas having a volume higher than 200 cubic meters.

Alternatively or complementarity, the characteristic(s) of the area include a human activity in the area. For example, the human activity in the area comprises periods of time when the room is occupied by humans (e.g. during the day or during the night, in the morning or in the afternoon, during the week or the week-end, etc.). Alternatively or complementarily, the human activity in the area defines the type of activity performed by the persons occupying the area; for instance, the area is an office room, a room in a store, a storage room, a workshop room, a room in a house or an apartment, etc.

The aforementioned area type identifier of the area can also be based on the human activity in the area. Furthermore, a person skilled in the art would readily understand that other types of area characteristics could be used in the context of an environment control system managed by the environment controller 100.

FIG. 2 illustrates examples of the determination of the characteristic(s) of the area by the processing unit 110 of the environment controller 100.

The determination of the characteristic(s) of the area comprises receiving the characteristic(s) of the area from a computing device 20 via the communication interface 130, and storing the characteristic(s) of the area in the memory 120 of the environment controller 100.

Alternatively or complementarily, the determination of the characteristic(s) of the area comprises receiving the characteristic(s) of the area from the user 10 via the user interface 140 of the environment controller 100, and storing the characteristic(s) of the area in the memory 120.

Alternatively or complementarily, the determination of the characteristic(s) of the area comprises receiving the characteristic(s) of the area from a sensor 240 via the communication interface 130, and storing the characteristic(s) of the area in the memory 120 of the environment controller 100. The sensor 240 is capable of automatically determining characteristic(s) of the area. For example, the sensor 240 combines one or more cameras, and a processing unit, capable of automatically determining geometric characteristics of the area. In another example, the sensor 240 combines one or more cameras (or sound sensor, motion detector, etc.), and a processing unit, capable of automatically determining a human activity in the area. Alternatively, the sensor 240 only transmits collected data (e.g. images of the area) to the processing unit 110 of the environment controller 100, and the processing unit 110 determines the characteristic(s) of the area based on the data transmitted by the sensor 240.

The characteristic(s) of the area usually do not change over time. Thus, the determination occurs only once, and the characteristics of the area are permanently stored in the memory 120 for being used by the neural network inference engine 112, as will be illustrated later in the description.

Reference is now made concurrently to FIGS. 1, 2, 3A, 3B, 3C and 3D; where FIGS. 3A, 3B, 3C and 3D represent a method 500. At least some of the steps of the method 500 are implemented by the environment controller 100. The method 500 aims at improving a predictive model of a neural network used by the environment controller 100 (more specifically by the neural network inference engine 112). The present disclosure is not limited to the method 500 being implemented by the environment controller 100, but is applicable to any type of computing device capable of implementing the steps of the method 500.

A dedicated computer program has instructions for implementing at least some of the steps of the method 500. The instructions are comprised in a non-transitory computer program product (e.g. the memory 120) of the environment controller 100. The instructions provide for improving a predictive model of a neural network used by the environment controller 100 (more specifically by the neural network inference engine 112), when executed by the processing unit 110 of the environment controller 100. The instructions are deliverable to the environment controller 100 via an electronically-readable media such as a storage media (e.g. CD-ROM, USB key, etc.), or via communication links (e.g. via a communication network through the communication interface 130).

The instructions of the dedicated computer program executed by the processing unit 110 implement the neural network inference engine 112 and the control module 114. The neural network inference engine 112 provides functionalities of a neural network, allowing to infer output(s) based on inputs using the predictive model, as is well known in the art. The control module 114 provides functionalities allowing the environment controller 100 to interact with and control other devices (e.g. the sensors (200, 210, 220 and 230) and the controlled appliance 300).

The method 500 comprises the step 505 of storing a predictive model in the memory 120. Step 505 is performed by the processing unit 110. The predictive model comprises weights of a neural network implemented by the neural network inference engine 112.

The method 500 comprises the step 510 of determining at least one environmental characteristic value in the area. Step 510 is performed by the control module 114 executed by the processing unit 110. The at least one environmental characteristic value includes one or more of the following: a current temperature in the area, a current humidity level in the area, a current $CO_2$ level in the area, and a current occupancy of the area. However, other types of environmental characteristic value may be determined at step 510.

In the case of the current temperature, the measurement of the current temperature is performed by the temperature sensor 200 (located in the area) and transmitted to the environment controller 100. Thus, step 510 includes receiving the current temperature from the temperature sensor 200 via the communication interface 130. Alternatively, functionalities of a temperature sensor are integrated to the environment controller 100. In this case, step 510 includes receiving the current temperature from a temperature sensing module (not represented in FIG. 1) integrated to the environment controller 100. In still another implementation, step 510 includes calculating the current temperature in the area based on temperature measurements respectively received from a plurality of temperature sensors 200 located in the area (e.g. calculating the average of the temperature measurements received from the plurality of temperature sensors 200).

In the case of the current humidity level, the measurement of the current humidity level is performed by the humidity sensor 210 (located in the area) and transmitted to the environment controller 100. Thus, step 510 includes receiving the current humidity level from the humidity sensor 210 via the communication interface 130. Alternatively, functionalities of a humidity sensor are integrated to the environment controller 100. In this case, step 510 includes receiving the current humidity level from a humidity sensing module (not represented in FIG. 1) integrated to the environment controller 100. In still another implementation, step 510 includes calculating the current humidity level in the area based on humidity level measurements respectively received from a plurality of humidity sensors 210 located in the area (e.g. calculating the average of the humidity level measurements received from the plurality of humidity sensors 210).

In the case of the current $CO_2$ level, the measurement of the current $CO_2$ level is performed by the $CO_2$ sensor 220 (located in the area) and transmitted to the environment controller 100. Thus, step 510 includes receiving the current CO2 level from the CO2 sensor 220 via the communication interface 130. Alternatively, functionalities of a CO2 sensor are integrated to the environment controller 100. In this case, step 510 includes receiving the current CO2 level from a CO2 sensing module (not represented in FIG. 1) integrated to the environment controller 100. In still another implementation, step 510 includes calculating the current CO2 level in the area based on CO2 level measurements respectively received from a plurality of CO2 sensors 220 located in the area (e.g. calculating the average of the CO2 level measurements received from the plurality of CO2 sensors 220).

In the case of the current occupancy of the area, the measurement of occupancy data is performed by the occupancy sensor 230 (located in the area) and transmitted to the environment controller 100. In a first implementation, the current occupancy of the area directly consists of the occupancy data. Thus, step 510 includes directly receiving the current occupancy of the area from the occupancy sensor 230 via the communication interface 130. For example, an ultrasonic or infrared sensor determines if the area is occupied or not, and transmits the current occupancy status of the area (occupied or not) to the environment controller 100. In a second implementation, the current occupancy of the area is determined by processing the occupancy data. Thus, step 510 includes receiving the occupancy data from the occupancy sensor 230 via the communication interface 130, and further processing the occupancy data to generate the current occupancy of the area. For example, a visible or thermal camera transmits picture(s) of the area to the environment controller 100, and a detection software implemented by the environment controller 100 analyses the picture(s) to determine the number of persons present in the area. Alternatively, functionalities of an occupancy sensor are integrated to the environment controller 100. In this case, step 510 includes receiving the occupancy data from an occupancy sensing module (not represented in FIG. 1) integrated to the environment controller 100.

Ultimately, the current occupancy of the area determined at step 510 comprises one of the following: an indication of the area being occupied or not, a number of persons present in the area, a number of persons entering or leaving the area. A person skilled in the art would readily understand that other types of occupancy sensors 230 may be used in the context of the present disclosure, to determine the aforementioned types of current occupancy of the area, or other types of current occupancy of the area.

The method 500 comprises the step 515 of receiving at least one set point. Step 515 is performed by the control module 114 executed by the processing unit 110. As mentioned previously, the at least one set point includes one or more of the following: a target temperature, a target humidity level, and a target CO2 level. However, other types of set point may be determined at step 515.

Figure 3A:
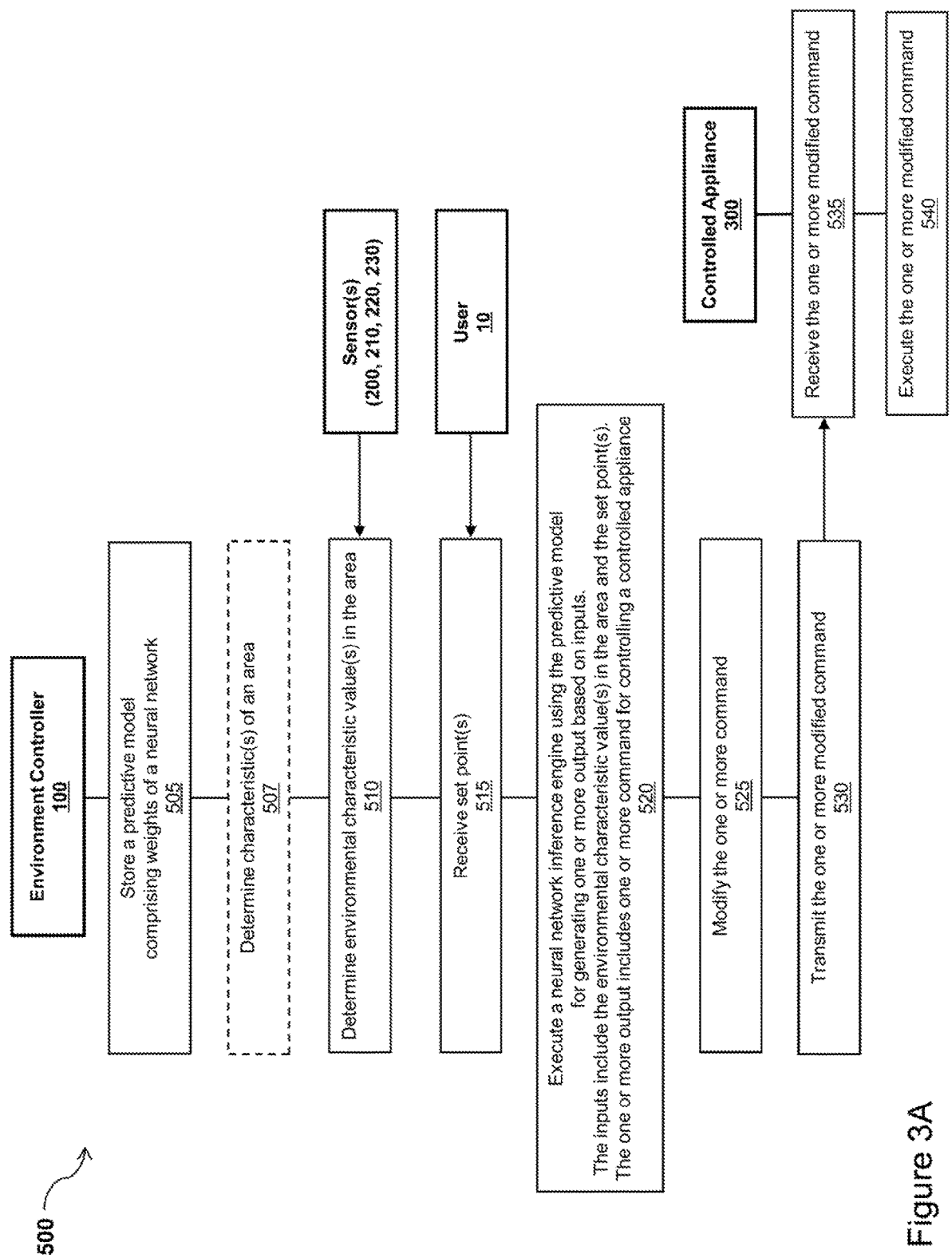
FIGS. 3A, 3B, 3C and 3D illustrate a method performed by the environment controller of FIG. 1 for improving a predictive model of a neural network used by the environment controller.
Figure 3B:
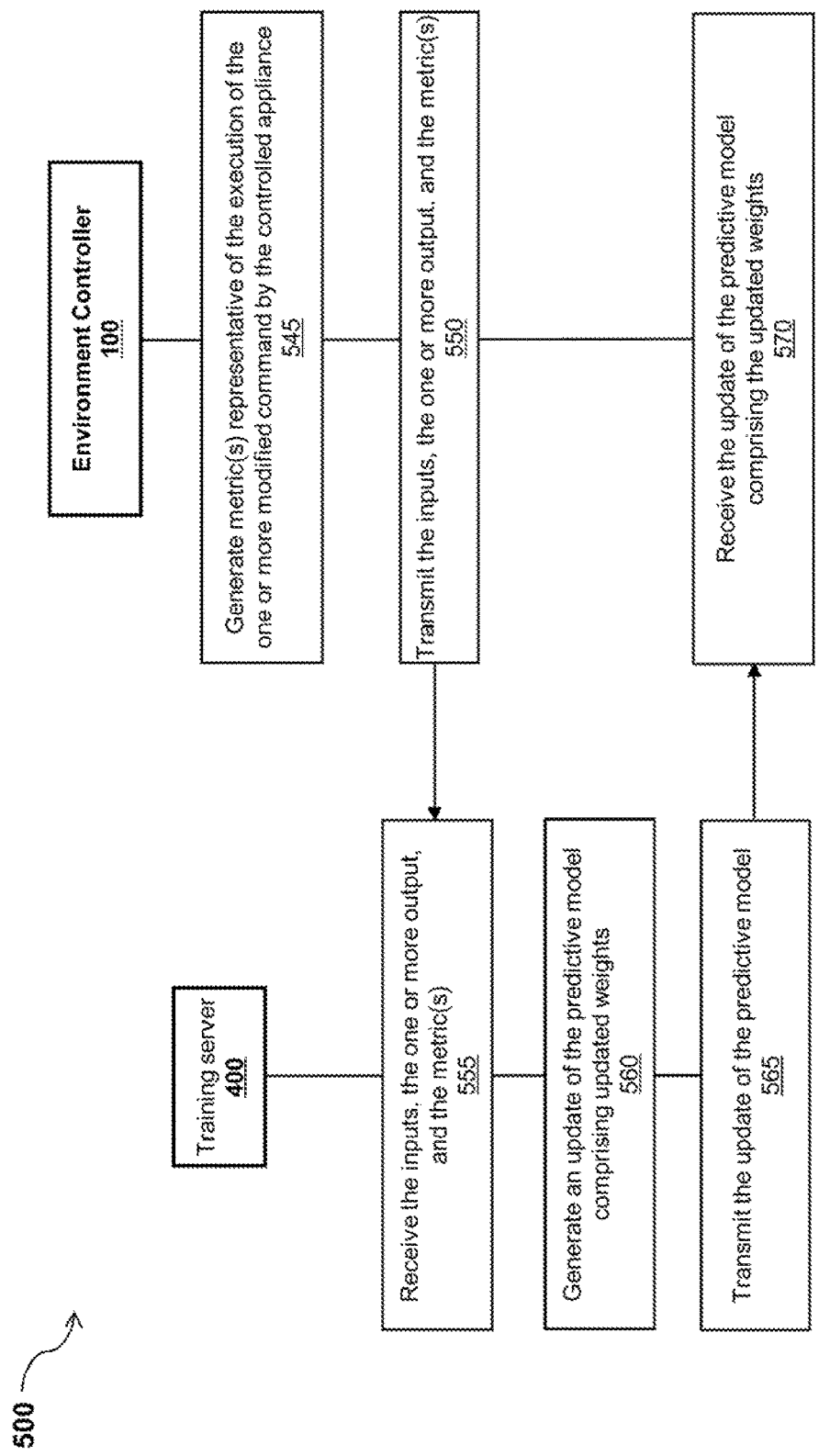

A set point is received from the user 10 via the user interface 140 (as illustrated in FIGS. 1 and 3A). Alternatively, a set point is received from a remote computing device via the communication interface 130 (this use case is not represented in the Figures for simplification purposes). For example, the user 10 enters the set point via a user interface of the remote computing device (e.g. a smartphone) and the set point is transmitted to the environment controller 10.

The order in which steps 510 and 515 are performed may vary. The order represented in FIG. 3A is for illustration purposes only.

The method 500 comprises the step 520 of executing the neural network inference engine 112 using the predictive model (stored at step 505) for generating one or more output based on inputs. The execution of the neural network inference engine 112 is performed by the processing unit 110. The neural network inference engine 112 implements a neural network using the weights of the predictive model. This step will be further detailed later in the description.

The inputs comprise the at least one environmental characteristic value in the area determined at step 510, and the at least one set point received at step 515.

The inputs used by the neural network inference engine 112 at step 520 may include additional parameter(s). For example, the method 500 comprises the optional step 507 of determining at least one characteristic of the area. Optional step 507 is performed by the control module 114 executed by the processing unit 110. The determination of characteristic(s) of the area has been detailed previously in relation to FIG. 2. The at least one characteristic of the area includes one or more of the following: an area type identifier selected among a plurality of area type identifiers, one or more geometric characteristics of the area, and a human activity in the area. The inputs used at step 520 further include the characteristic(s) of the area. Another example of additional parameter(s) for the inputs include an external temperature measured outside the building (where the area is located) and/or an external humidity level measured outside the building.

The one or more output comprises one or more command for controlling the controlled appliance 300. As mentioned previously, an example of controlled appliance 300 is a VAV appliance. Examples of commands for controlling the VAV appliance 300 include commands directed to one of the following actuation modules of the VAV appliance 300: an actuation module controlling the speed of a fan, an actuation module controlling the pressure generated by a compressor, an actuation module controlling a valve defining the rate of an airflow, etc. Although the present disclosure focuses on generating command(s) for controlling appliance(s) at step 520, other types of output may be generated in addition to the command(s) at step 520.

The method 500 comprises the step 525 of modifying the one or more command generated at step 520. Step 525 is performed by the control module 114 executed by the processing unit 110.

Different algorithms may be implemented at step 525. Following are examples of algorithms for modifying the one or more command. However, a person skilled in the art would readily understand that other algorithms may be used in the context of the present disclosure.

In a first implementation, the modification to a command is random. Furthermore, the random modification may be limited to a pre-defined range of modifications. For example, the command consists in adjusting the speed of a fan, and the predefined range of modifications is between −10% and +10%. If the speed generated at step 520 is 20 revolutions per second, then a random value between 18 and 22 revolutions per second is generated at step 525.

In a second implementation, the modification to a command is selected among a set of one or more pre-defined modification. For example, the command consists in adjusting the speed of a fan, and the predefined modifications consist of +5%, +10%, −5% and −10%. If the speed generated at step 520 is 20 revolutions per second, then a value among 18, 19, 21 and 22 revolutions per second is selected at step 525. The sub-algorithm for selecting one among a plurality of pre-defined modifications is out of the scope of the present disclosure.

In the case where the one or more command generated at step 520 includes two or more commands, the modification may affect any combination of the commands (e.g. all the commands are modified or only some of the commands are modified). For example, if the one or more command includes one command for adjusting the speed of a fan and one command for adjusting the pressure generated by a compressor, the modification at step 525 includes one of the following: only adjust the speed of the fan, only adjust the pressure generated by the compressor, or simultaneously adjust the speed of the fan and the pressure generated by the compressor. Furthermore, the selection of which commands are modified may vary each time step 525 is performed, using a random algorithm or a pre-defined modification schedule.

In an exemplary implementation, the type of modification(s) to be applied at step 525 is received via the communication interface 130. For example, the training server 400 sends a configuration message to the environment controller 100. The configuration message defines the type of modification(s) to be applied at step 525. As will be illustrated later in the description, this mechanism allows the training server 400 to control a plurality of environment controllers 100 via configuration messages defining various types of modification(s) to be applied at step 525. Thus, the training server 400 drives a fleet of environment controllers 100 respectively applying modifications at step 525. Each environment controller 100 has its own range of modifications, allowing a wide range of exploratory modifications for the purpose of improving the predictive model. The configuration data (type of modification(s) to be applied) included in the configuration message are stored in the memory 120 and used each time step 525 is performed. Each environment controller 100 can also be reconfigured by the training server 400 via a new configuration message defining a new set of modification(s) to be applied at step 525.

The method 500 comprises the step 530 of transmitting the one or more modified command (generated at step 520 and modified at step 525) to the controlled appliance 300 via the communication interface 130. Step 530 is performed by the control module 114 executed by the processing unit 110.

The method 500 comprises the step 535 of receiving the one or more modified command at the controlled appliance 300, via the communication interface of the controlled appliance 300. Step 535 is performed by the processing unit of the controlled appliance 300.

The method 500 comprises the step 540 of executing the one or more modified command at the controlled appliance 300. Step 540 is performed by the processing unit of the controlled appliance 300. Executing the one or more modified command consists in controlling one or more actuation module of the controlled appliance 300 based on the received one or more modified command.

As mentioned previously, a single command or a plurality of commands is generated at step 520 and transmitted at step 530 (after modification at step 525) to the same controlled appliance 300. Alternatively, the same command is generated at step 520 and transmitted at step 530 to a plurality of controlled appliances 300. In yet another alternative, a plurality of commands is generated at step 520 and transmitted at step 530 to a plurality of controlled appliances 300.

The method 500 comprises the step 545 of generating at least one metric representative of the execution (at step 540) of the one or more modified command by the controlled appliance 300. Step 545 is performed by the control module 114 executed by the processing unit 110.

The role of the one or more metric is to provide a quantified evaluation of the efficiency of the execution of the modified command(s) (at step 540). More specifically, since the one or more modified command aims at reaching the set point(s) received at step 515, the one or more metric evaluates the efficiency of execution of the one or more modified command for the purpose of reaching the set point(s). The efficiency may be measured according to various criteria, including the time required for reaching an environmental state corresponding to the set point(s), the adequacy of the reached environmental state with respect to the set point(s), the impact on the comfort of the users present in the area, etc.

Examples of metrics include the determination of one or more updated environmental characteristic value in the area following the transmission of the modified command(s), the measurement of one or more time required for reaching one or more corresponding environmental state in the area (e.g. reaching one or more set point) following the transmission of the modified command(s), the measurement of an energy consumption by the execution of the modified command(s), etc.

For illustration purposes, we consider the use case where a target temperature is included in the set point(s). A first example of metric consists of an updated temperature measured by the temperature sensor 200 and transmitted to the environment controller 100 after a given amount of time (e.g. 5 minutes), following the transmission of the modified command(s) at step 530. A second example of metric consists of several updated temperatures measured by the temperature sensor 200 and transmitted to the environment controller 100 at various interval of times (e.g. respectively 5 minutes and 10 minutes), following the transmission of the modified command(s) at step 530. This second example allows an evaluation of the trajectory of the variation of temperature in the area from the current temperature (determined at step 510) to the target temperature (received at step 515). A third example of metric consists of a measurement of the time required for reaching the target temperature, following the transmission of the modified command(s) at step 530. In this third example, the environment controller 100 starts a timer following the transmission of the modified command(s) at step 530. The environment controller 100 receives updated temperatures measured by the temperature sensor 200 and transmitted to the environment controller 100. Upon reception of an updated temperature substantially equal to the target temperature, the environment controller 100 stops the timer. The measurement of the required time is the difference between the times at which the timer was respectively stopped and started. A fourth example of metric consists of several measurements of the time required for reaching milestones on the trajectory from the current temperature towards the target temperature, following the transmission of the modified command(s) at step 530. For example, a first milestone corresponds to a temperature halfway between the current temperature and the target temperature, and a second milestone corresponds to the target temperature.

The previous exemplary metrics are for illustration purposes only. A person skilled in the art would be capable of implementing other metrics particularly adapted to the specific inputs and outputs used by the neural network inference engine 112 at step 520.

The method 500 comprises the step 550 of transmitting the inputs used by the neural network inference engine 112

(at step 520), the one or more output generated by the neural network inference engine 112 (at step 520), and the at least one metric (generated at step 545) to the training server 400 via the communication interface 130. Step 550 is performed by the control module 114 executed by the processing unit 110. All the data transmitted at step 550 are referred to as training data in FIG. 1.

A new set of training data is transmitted to the training server 400 as soon as it is available (after each execution of steps 520-525-530-545). Alternatively, the transmission of a new set of training of data to the training server 400 is delayed until a certain amount of training data has been collected (the transmission of all the collected training data occurs after several executions of steps 520-525-530-545).

The method 500 comprises the step 555 of receiving the inputs, the one or more output and the at least one metric (transmitted at step 550) at the training server 400, via the communication interface of the training server 400. Step 555 is performed by the processing unit of the training server 400.

The predictive model stored by the environment controller 100 is also stored by the training server 400.

The method 500 comprises the step 560 of generating an update of the predictive model. Step 560 is performed by the processing unit of the training server 400. The update of the predictive model comprises an update of the weights of the neural network. The update is performed based on the inputs, the one or more output and the at least one metric received at step 555.

The method 500 comprises the step 565 of transmitting the update of the predictive model (comprising the updated weights) to the environment controller 100, via the communication interface of the training server 400. Step 565 is performed by the processing unit of the training server 400.

Steps 555, 560 and 565 will be detailed later, when providing a detailed description of the functionalities of the training server 400.

The method 500 comprises the step 570 of receiving the update of the predictive model (comprising the updated weights) from the training server 400 via the communication interface 130. Step 570 is performed by the control module 114 executed by the processing unit 110.

Figure 3C:
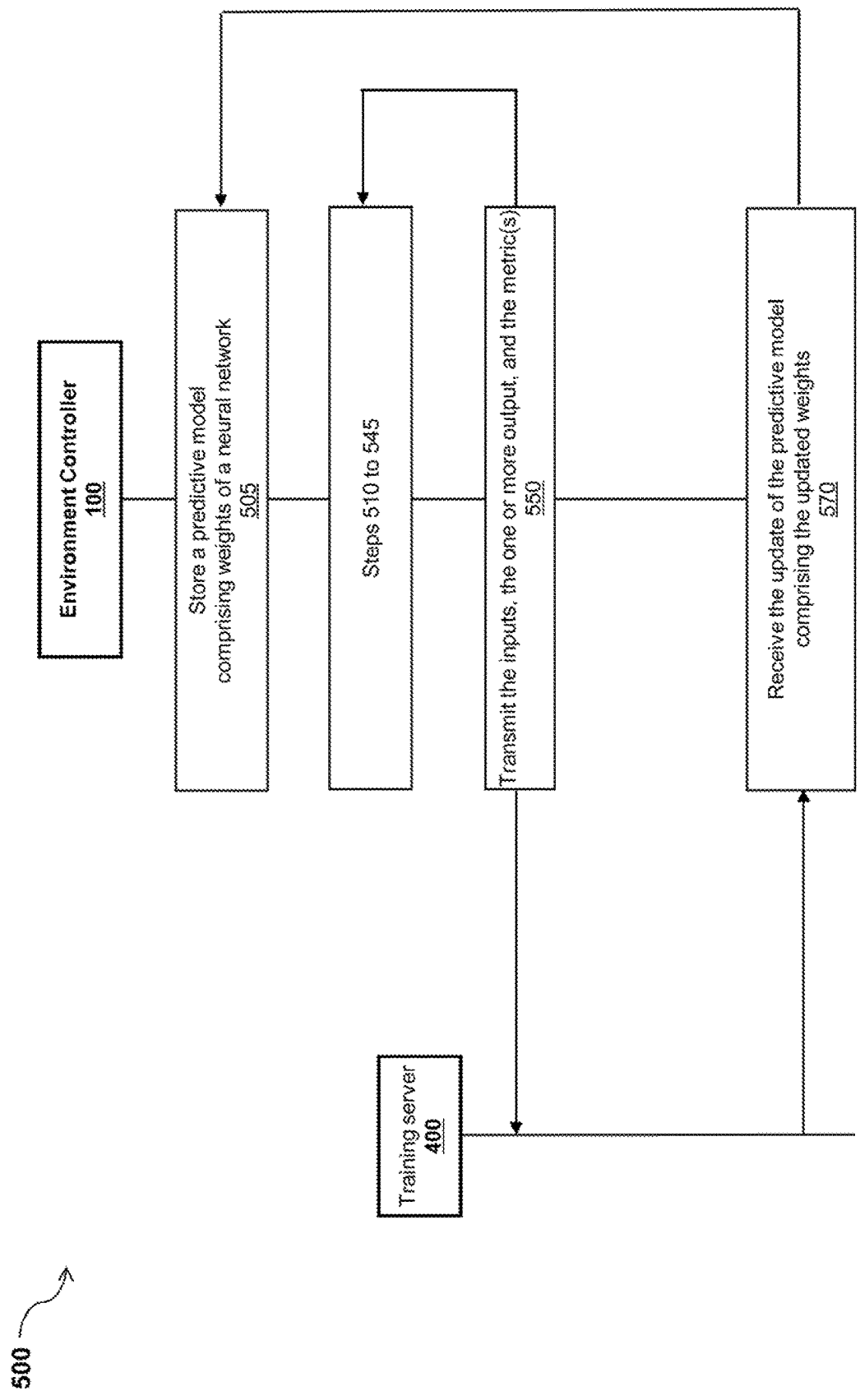

Reference is now made more particularly to FIG. 3C. During a training phase, the method 500 is used for generating an operational predictive model based on an initial predictive model. Steps 510 to 550 are repeated systematically. The initial predictive model is stored at step 505. Then, the repetition of steps 510 to 550 provides data to the training server 400 for improving the initial predictive model. At some point, the training server 400 determines that an operational version of the predictive model is ready, and transmits the operational version to the environment controller 100. The operational version is received at step 570 and stored at step 505.

Figure 3D:
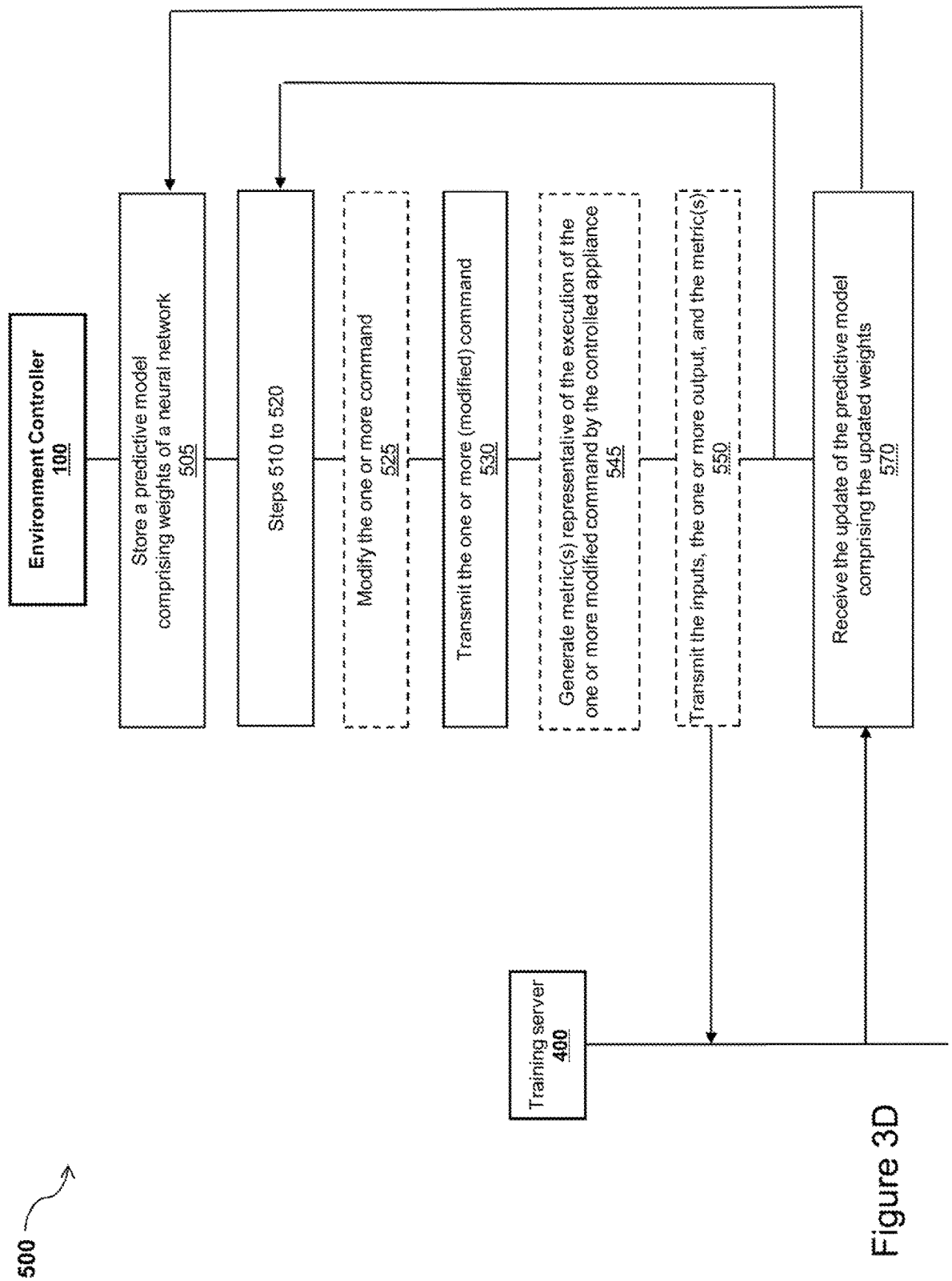

Reference is now made more particularly to FIG. 3D. During an operational phase, the method 500 can be used to improve/fine-tune the current predictive model. Steps 525, 545 and 550 are not performed systematically, but only once in a while (for example, once every ten occurrences of step 520). The rest of the time, the command(s) generated at step 520 are not modified. The execution of steps 525, 545 and 550 provides data to the training server 400 for improving the current predictive model. At some point, the training server 400 determines that an improved version of the predictive model is ready, and transmits the improved version to the environment controller 100. The improved version is received at step 570 and stored at step 505.

The steps of the method 500 involving the reception or the transmission of data by the environment controller 100 may use the same communication interface 130 or different communication interfaces 130. For example, steps 510, optionally 515, and 530 use a first communication interface 130 of the Wi-Fi type; while steps 550 and 570 use a second communication interface 130 of the Ethernet type. In another example, steps 510, optionally 515, 530, 550 and 570 use the same communication interface 130 of the Wi-Fi type.

In an alternative implementation, for each environmental characteristic value considered at step 510, a plurality of consecutive measurements of the environmental characteristic value is determined at step 510 (instead of a single current environmental characteristic value). For example, the inputs used by the neural network inference engine 112 at step 520 include a plurality of consecutive temperature measurements in the area (instead of a single current temperature in the area), and/or a plurality of consecutive humidity level measurements in the area (instead of a single current humidity level in the area), and/or a plurality of consecutive $CO_2$ level measurements in the area, (instead of a single current $CO_2$ level in the area). For instance, a measurement is determined (e.g. received from a corresponding sensor) every minute and the last five consecutive measurements (the current one, one minute before, two minutes before, three minutes before, and four minutes before) are stored in the memory 120. At step 520, the inputs include the last five consecutive measurements stored in the memory 120 (e.g. the last five consecutive temperature measurements and the last five consecutive humidity measurements).

Figure 4:
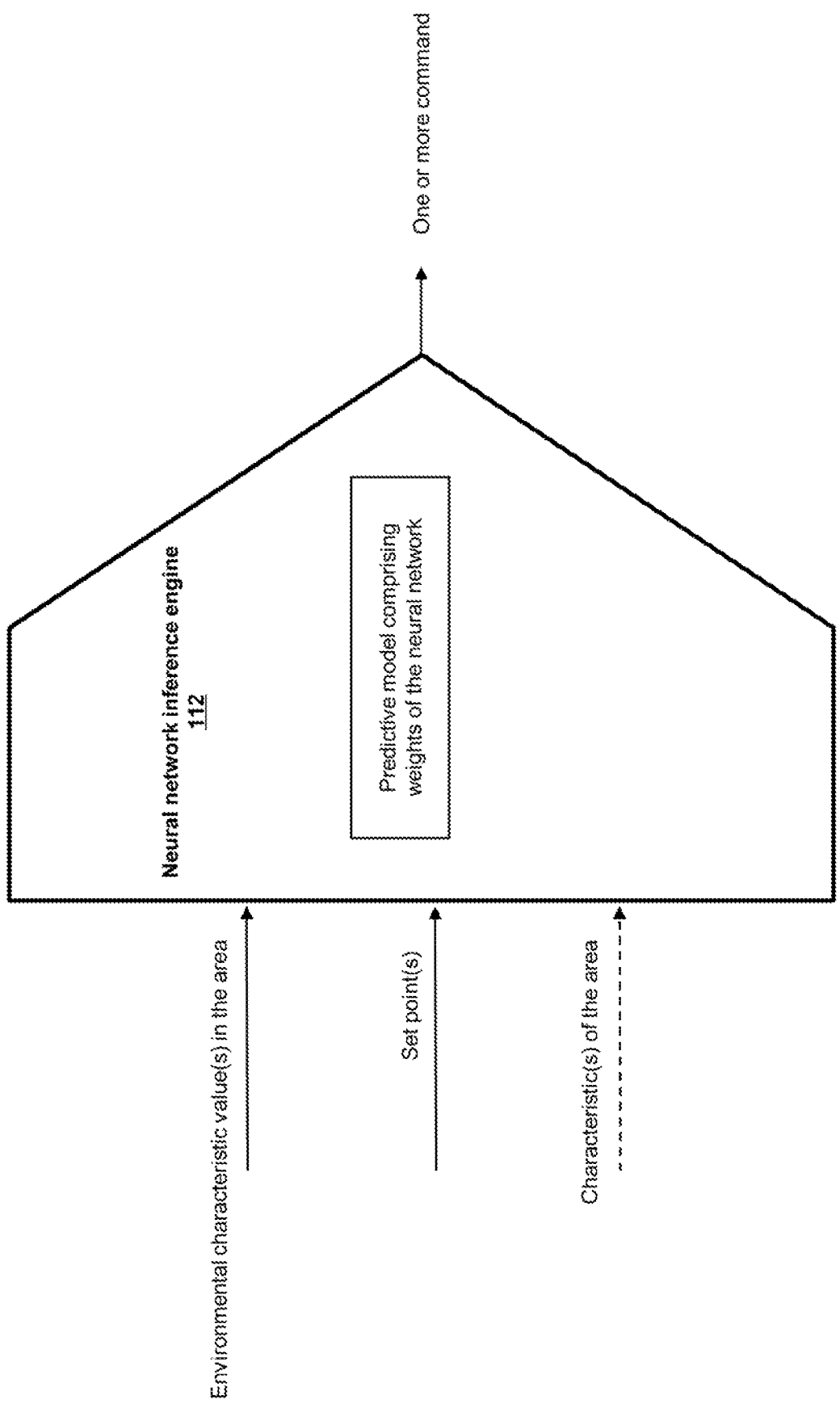
FIG. 4 is a schematic representation of a neural network inference engine executed by the environment controller of FIG. 1 according to the method of FIGS. 3A-D.

FIG. 4 is a schematic representation of the neural network inference engine 112 illustrating the inputs and the outputs used by the neural network inference engine 112 when performing step 520.

Figure 5:
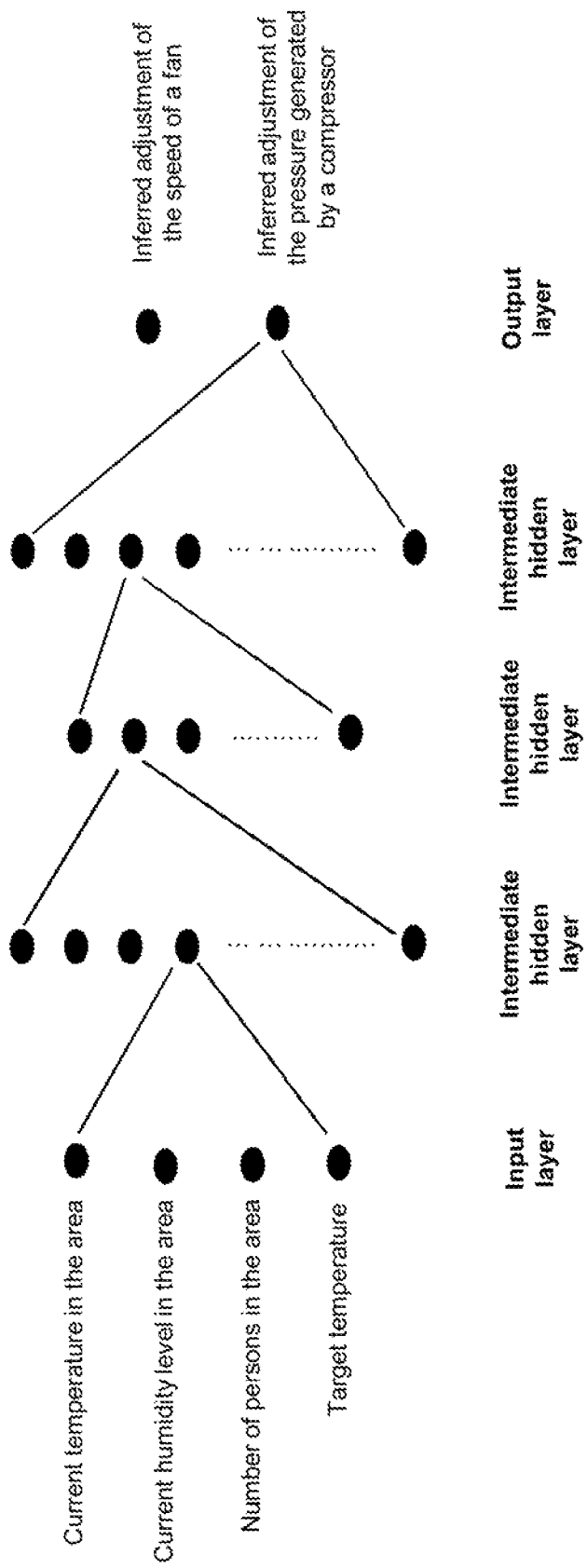
FIG. 5 is a detailed representation of a neural network implemented by the neural network inference engine of FIG. 4.

FIG. 5 is a detailed representation of an exemplary neural network implemented by the neural network inference engine 112.

The neural network includes an input layer with four neurons for receiving four input parameters (the current temperature in the area, the current humidity level in the area, the number of persons present in the area, and the target temperature). The neural network includes an output layer with two neurons for outputting two output values (the inferred adjustment of the speed of a fan and the inferred adjustment of the pressure generated by a compressor). The neural network includes three intermediate hidden layers between the input layer and the output layer. All the layers are fully connected. The number and type of inputs (four in FIG. 5) and outputs (two in FIG. 5) of the neural network are for illustration purposes only. Any combination of inputs and outputs supported by the present description can be applied to the neural network illustrated in FIG. 5.

The number of intermediate hidden layers is an integer greater or equal than 1 (FIG. 5 represents three intermediate hidden layers for illustration purposes only). The number of neurons in each intermediate hidden layer may vary. During the training phase of the neural network, the number of intermediate hidden layers and the number of neurons for each intermediate hidden layer are selected, and may be adapted experimentally.

The generation of the outputs based on the inputs using weights allocated to the neurons of the neural network is well known in the art. The architecture of the neural network, where each neuron of a layer (except for the first layer) is connected to all the neurons of the previous layer is also well known in the art.

Figure 6:
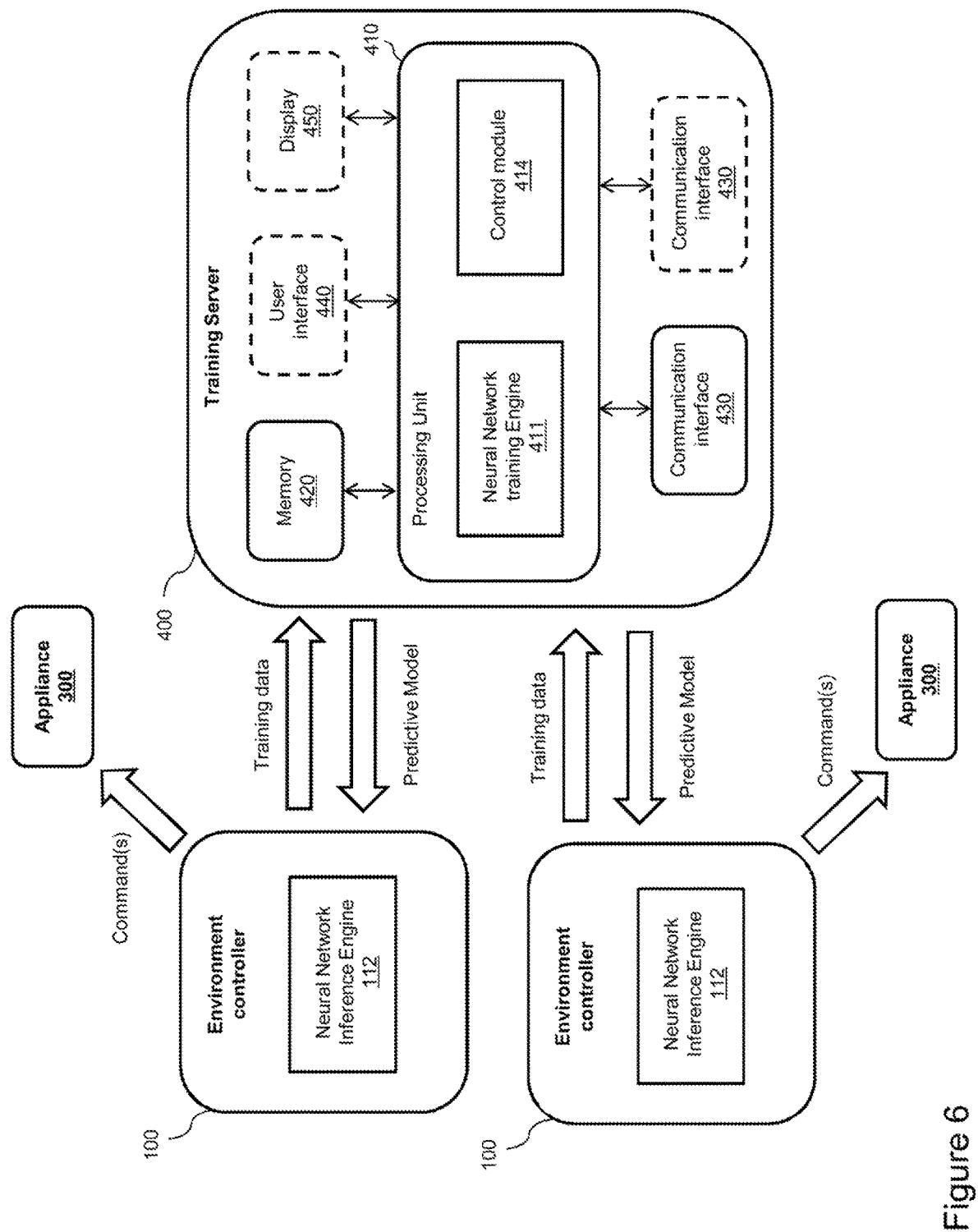
FIG. 6 represents an environment control system where several environment controllers implementing the method illustrated in FIGS. 3A-D are deployed.

Reference is now made concurrently to FIGS. 1, 3A-D and 6, where FIG. 6 illustrates the usage of the method 500 in a large environment control system.

A plurality of environment controllers 100 implementing the method 500 are deployed at different locations. Only two environment controllers 100 are represented in FIG. 6 for illustration purposes, but any number of environment controllers 100 may be deployed. Each environment controller 100 represented in FIG. 6 corresponds to the environment controller 100 represented in FIG. 1. Each environment controller 100 interacts with the same entities as represented in FIG. 1, such as the controlled appliance 300 (the sensors illustrated in FIG. 1 are not represented in FIG. 6 for simplification purposes).

In an exemplary configuration, the different locations are within a building, and the environment controllers 100 are deployed at different floors of the building, different rooms of the building, etc. The training server 400 is also deployed in the building. Alternatively, the training server 400 is deployed at a remote location from the building, for example in a remote cloud infrastructure. In another configuration, the environment controllers 100 are deployed at different buildings. The training server 400 is deployed in one of the buildings, or at a remote location from the buildings.

Each environment controller 100 receives an initial predictive model from the centralized training server 400. The same initial predictive model is used for all the environment controllers 100. Each environment controller 100 generates training data when using the initial predictive model, and the training data are transmitted to the training server 400. The training server 400 uses the training data from all the environment controllers 100 to improve the initial predictive model. At some point, an improved predictive model generated by the training server 400 is transmitted to the environment controllers 100, and used by all the environment controllers 100 in place of the initial predictive model. Several iterations of this process can be performed, where the environment controllers 100 use a current version of the predictive model to generate training data, and the training data are used by the training server 400 to generate a new version of the predictive model.

The environment controllers 100 control environments having substantially similar characteristics, so that the same predictive model is adapted to all the environment controllers 100. For example, the environment controllers 100 control the environment of rooms having substantially similar geometric characteristics, and/or substantially the same type of human activity in the rooms, etc.

Details of the components of the training server 400 are also represented in FIG. 6. The training server 400 comprises a processing unit 410, memory 420, and a communication interface 430. The training server 400 may comprise additional components, such as another communication interface 430, a user interface 440, a display 450, etc.

The characteristics of the processing unit 410 of the training server 400 are similar to the previously described characteristics of the processing unit 110 of the environment controller 100. The processing unit 410 executes the neural network training engine 411 and a control module 414.

The characteristics of the memory 420 of the training server 400 are similar to the previously described characteristics of the memory 120 of the environment controller 100.

The characteristics of the communication interface 430 of the training server 400 are similar to the previously described characteristics of the communication interface 130 of the environment controller 100.

Figure 7:
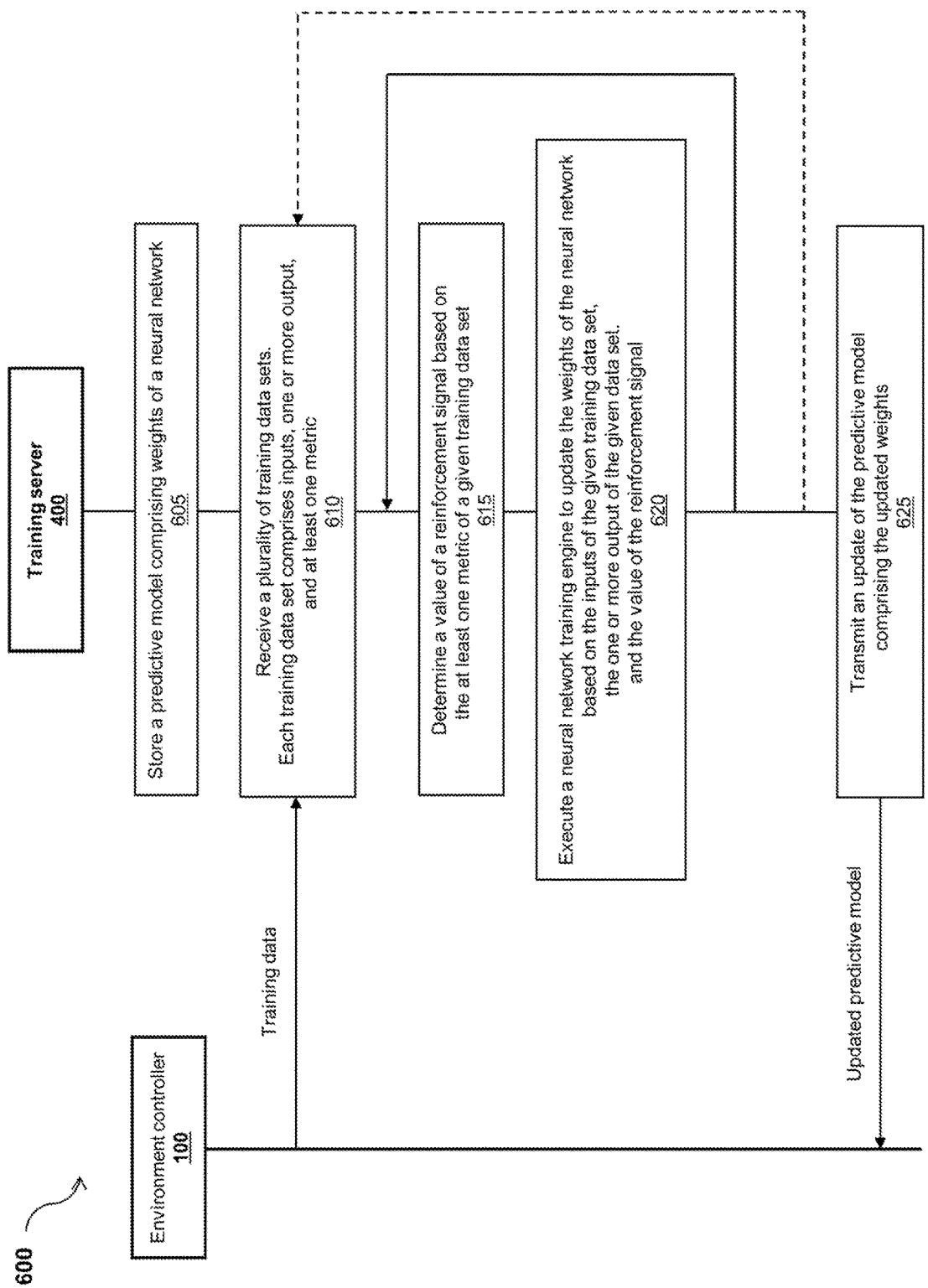
FIG. 7 illustrates a method performed by a training server represented in FIG. 6 for improving a predictive model of a neural network used by the environment controllers of FIG. 6.

Reference is now made concurrently to FIGS. 1, 3A-D, 6 and 7. FIG. 7 represents a method 600 for improving a predictive model of a neural network used by the environment controllers 100 (more specifically by the neural network inference engines 112) through reinforcement learning. At least some of the steps of the method 600 represented in FIG. 7 are implemented by the training server 400. The present disclosure is not limited to the method 600 being implemented by the training server 400, but is applicable to any type of computing device capable of implementing the steps of the method 600.

A dedicated computer program has instructions for implementing at least some of the steps of the method 600. The instructions are comprised in a non-transitory computer program product (e.g. the memory 420) of the training server 400. The instructions provide for improving the predictive model of the neural network used by the environment controllers 100 (more specifically by the neural network inference engines 112) through reinforcement learning, when executed by the processing unit 410 of the training server 400. The instructions are deliverable to the training server 400 via an electronically-readable media such as a storage media (e.g. CD-ROM, USB key, etc.), or via communication links (e.g. via a communication network through the communication interface 430).

The instructions of the dedicated computer program executed by the processing unit 410 implement the neural network training engine 411 and the control module 414. The neural network training engine 411 provides functionalities for training a neural network, allowing to improve a predictive model (more specifically to optimize weights of the neural network), as is well known in the art. The control module 414 provides functionalities allowing the training server 400 to gather data used for the training of the neural network.

An initial predictive model is generated by the processing unit 410 of the training server 400 and transmitted to the plurality of environment controllers 100 via the communication interface 430 of the training server 400. Alternatively, the initial predictive model is generated by and received from another computing device (via the communication interface 430 of the training server 400). The initial predictive model is also transmitted by the other computing device to the plurality of environment controllers 100.

The generation of the initial predictive model is out of the scope of the present disclosure. Generating the initial predictive model comprises defining a number of layers of the neural network, a number of neurons per layer, the initial value for the weights of the neural network, etc.

The definition of the number of layers and the number of neurons per layer is performed by a person highly skilled in the art of neural networks. Different algorithms (well documented in the art) can be used for allocating an initial value to the weights of the neural network. For example, each weight is allocated a random value within a given interval (e.g. a real number between −0.5 and +0.5), which can be adjusted if the random value is too close to a minimum value (e.g. −0.5) or too close to a maximum value (e.g. +0.5).

The execution of the method 600 by the training server 400 and the execution of the method 500 by the environment controllers 100 provide for improving the initial predictive model (more specifically to optimize the weights of the predictive model). At the end of the training phase, an improved predictive model is ready to be used by the neural network inference engines 112 of the plurality of environment controllers 100. Optionally, the improved predictive model can be used as a new initial predictive model, which can be further improved by implementing the aforementioned procedure again.

The method 600 comprises the step 605 of storing the initial predictive model in the memory 420. Step 605 is performed by the processing unit 410. The initial predictive model comprises the weights of the neural network implemented by the neural network training engine 411.

The method 600 comprises the step 610 of receiving a plurality of training data sets via the communication interface 430. Step 610 is performed by the control module 414 executed by the processing unit 410. The training data sets are received from the plurality of environment controllers 100. Step 610 corresponds to step 550 of the method 500 executed by the environment controllers 100.

Each training data set comprises inputs of the neural network implemented by the neural network training engine 411, one or more output of the neural network implemented by the neural network training engine 411, and at least one metric. The inputs comprise at least one environmental characteristic value in the area under the control of the corresponding environment controller 100 (determined at step 510 of the method 500) and at least one set point (received at step 515 of the method 500). The one or more output comprises one or more command for controlling the controlled appliance 300 (generated at step 525 by modifying the command generated at step 520 of the method 500). The at least one metric (generated at step 545 of the method 500) is representative of an execution of the one or more command by the controlled appliance 300.

As mentioned previously, the at least one environmental characteristic value includes one or more of the following: a current temperature in the area, a current humidity level in the area, a current CO2 level in the area, and a current occupancy of the area. Alternatively, the at least one environmental characteristic value includes one or more of the following: a plurality of consecutive temperature measurements in an area, a plurality of consecutive humidity level measurements in the area, a plurality of consecutive carbon dioxide (CO2) level measurements in the area, and a plurality of consecutive determinations of an occupancy of the area. The at least one set point includes one or more of the following: a target temperature, a target humidity level, and a target CO2 level. Examples of the one or more command have also been described previously.

Optionally, the inputs include additional parameters used at step 520 of the method 500. For example, the inputs further include at least one characteristic of the area (determined at optional step 507 of the method 500). As mentioned previously, the at least one characteristic of the area includes one or more of the following: an area type identifier selected among a plurality of area type identifiers, one or more geometric characteristics of the area, and a human activity in the area. Optionally, the outputs include additional parameters different from command(s).

As illustrated in FIG. 7, steps 615 and 620 of the method 600 are repeated for each training data set received at step 610.

The method 600 comprises the step 615 of determining a value of a reinforcement signal based on the at least one metric of a given training data set (among the plurality of training data sets received at step 610). Step 615 is performed by the control module 414 executed by the processing unit 410.

The value of the reinforcement signal is one of positive reinforcement (also referred to as a positive reward) or negative reinforcement (also referred to as a negative reward). For example, the control module 414 implements a set of rules (stored in the memory 420) to determine the value of the reinforcement signal. The set of rules is designed for evaluating the efficiency of the modified command(s) transmitted at step 530 of the method 500 for reaching the set point(s) received at step 515 of the method 500. If the command(s) is evaluated as being efficient, the outcome is a positive reinforcement value for the reinforcement signal. If the command(s) is evaluated as not being efficient, the outcome is a negative reinforcement value for the reinforcement signal. The reinforcement signal takes only two Boolean values: positive reinforcement or negative reinforcement. Alternatively, the reinforcement signal is expressed as a percentage representing a relative efficiency. For example, positive reinforcement includes the values between 51 and 100%, while negative reinforcement includes the values between 0 and 49%. Alternatively, the reinforcement signal takes one among a pre-defined set of values (e.g. +1, +2, +3 for positive reinforcement and −1, −2, −3 for negative reinforcement). The neural network training engine 411 is adapted and configured to adapt the weights of the predictive model based on values chosen for implementing the reinforcement signals. A person skilled in the art would readily understand that the values of the reinforcement signal are not limited to the previous examples.

The determination of the value of the reinforcement signal may further takes into consideration the at least one set point included in the inputs received at step 610. Alternatively or complementarily, the determination of the value of the reinforcement signal may further takes into consideration the at least one environmental characteristic value in an area included in the inputs received at step 610. Alternatively or complementarily, the determination of the value of the reinforcement signal may further take into consideration the characteristic(s) of the area included in the inputs received at step 610 (if optional step 507 of the method 500 is performed).

Following are exemplary sets of rules for evaluating the efficiency of the command(s) transmitted at step 530 of the method 500, based on a target temperature (received at step 515 of the method 500) and a metric consisting of one or more updated temperature measurement (determined at step 545 of the method 500). The target temperature and the one or more updated temperature measurement are comprised in the training data transmitted at step 550 of the method 500 and received at step 610 of the method 600.

A first exemplary set of rules uses a single updated temperature measurement. The reinforcement signal is positive if the absolute difference between the target temperature and the updated temperature measurement is lower than a threshold (e.g. 0.5 degree Celsius). The reinforcement signal is negative otherwise.

A second exemplary set of rules uses several consecutive measurements of the updated temperature. For instance, the reinforcement signal is positive if the absolute difference between the target temperature and a first measurement of the updated temperature determined 5 minutes after transmitting the commands (at step 530 of the method 500) is lower than a first threshold (e.g. 2 degrees Celsius) AND the absolute difference between the target temperature and a second measurement of the updated temperature determined 10 minutes after transmitting the commands (at step 530 of the method 500) is lower than a second threshold (e.g. 0.5 degree Celsius). The reinforcement signal is negative otherwise.

A third exemplary set of rules further uses the volume of the area (determined at step 507 of the method 500, transmitted at step 550 of the method 500 and received at step 610 of the method 600). The reinforcement signal is positive if the absolute difference between the target temperature and the updated temperature measurement is lower than a first threshold (e.g. 0.5 degree Celsius) AND the volume of the area is lower than 150 cubic meters. The reinforcement signal is also positive if the absolute difference between the target temperature and the updated temperature measurement is lower than a second threshold (e.g. 1 degree Celsius) AND the volume of the area is higher than 150 cubic meters. The reinforcement signal is negative otherwise.

A fourth exemplary set of rules further uses the human activity in the area, and more specifically the type of activity performed by humans occupying the area (determined at step 507 of the method 500, transmitted at step 550 of the method 500 and received at step 610 of the method 600). The reinforcement signal is positive if the absolute difference between the target temperature and the updated temperature measurement is lower than a first threshold (e.g. 1 degree Celsius) AND the area is an office room. The reinforcement signal is also positive if the absolute difference between the target temperature and the updated temperature measurement is lower than a second threshold (e.g. 2 degrees Celsius) AND the area is a storage room. The reinforcement signal is negative otherwise.

A fifth exemplary set of rules also uses the human activity in the area, and more specifically periods of time when the area is occupied by humans (determined at step 507 of the method 500, transmitted at step 550 of the method 500 and received at step 610 of the method 600). The reinforcement signal is positive if the absolute difference between the target temperature and the updated temperature measurement is lower than a first threshold (e.g. 1 degree Celsius) AND the current time is within a period of occupation of the area (e.g. between 8 am and 6 pm from Monday to Saturday). The reinforcement signal is also positive if the absolute difference between the target temperature and the updated temperature measurement is lower than a second threshold (e.g. 2 degrees Celsius) AND the current time is within a period of inoccupation of the area (e.g. anytime except between 8 am and 6 pm from Monday to Saturday). The reinforcement signal is negative otherwise.

Following is another exemplary sets of rules for evaluating the efficiency of the command(s) transmitted at step 530 of the method 500, based on metric(s) consisting of one or more measurement of the time required for reaching the target temperature (received at step 515 of the method 500). The one or more measurement of the required time is determined at step 545 of the method 500. The one or more measurement of the required time is comprised in the training data transmitted at step 550 of the method 500 and received at step 610 of the method 600.

A first exemplary set of rules uses a single measurement consisting of the time required for reaching the target temperature. The reinforcement signal is positive if the measurement of the required time is lower than a threshold (e.g. 5 minutes). The reinforcement signal is negative otherwise.

A second exemplary set of rules uses several consecutive measurements of the of the time required for reaching the target temperature. For instance, the reinforcement signal is positive if a first measurement of the required time for reaching a temperature halfway between the current temperature measurement (determined at step 510 of the method 500) and the target temperature is lower than a first threshold (e.g. 2 minutes) AND a second measurement of the required time for reaching the target temperature is lower than a second threshold (e.g. 5 minutes). The reinforcement signal is negative otherwise.

In addition to the one or more measurement of the time required for reaching the target temperature, other set of rules may be defined, which further use the characteristics of the area determined at step 507 of the method 500 (e.g. volume of the area, human activity in the area, periods of time when the area is occupied by humans, etc.), as illustrated previously.

The previous exemplary sets of rules are for illustration purposes only. A person skilled in the art would be capable of implementing other sets of rules particularly adapted to the specific inputs and outputs used by the neural network inference engine 112 at step 520 of the method 500.

The method 600 comprises the step 620 of executing the neural network training engine 411 to update the weights of the neural network based on the inputs (of the given training data set), the one or more output (of the given training data set), and the value of the reinforcement signal (determined at step 615). The execution of the neural network training engine 411 is performed by the processing unit 410.

The neural network training engine 411 implements the neural network using the weights of the predictive model stored at step 605. The neural network implemented by the neural network training engine 411 corresponds to the neural network implemented by the neural network inference engine 112 (same number of layers, same number of neurons per layer). As mentioned previously, FIG. 5 is a detailed exemplary representation of such a neural network.

Reinforcement learning is a technique well known in the art of artificial intelligence. Having a set of inputs and the corresponding output(s), the weights of the predictive model are updated to force the generation of the corresponding output(s) when presented with the inputs, if the value of the reinforcement signal is a positive reinforcement. Complementarily, having a set of inputs and the corresponding output(s), the weights of the predictive model are updated to prevent the generation of the corresponding output(s) when presented with the inputs, if the value of the reinforcement signal is a negative reinforcement. Thus, having a given set of inputs and a candidate set of corresponding output(s), the neural network training engine 411 learns through reinforcement learning which one(s) among the candidate set of corresponding output(s) is (are) the best fit for the given set of input(s). In the context of the present disclosure, the neural network training engine 411 learns (through reinforcement learning) which command(s) is/are the best fit for reaching the set point(s), when presented with the current environmental characteristic value(s), the set point(s) and optionally the characteristic(s) of the area.

Additionally, during the training phase, the number of intermediate hidden layers of the neural network and the number of neurons per intermediate hidden layer can be adjusted to improve the accuracy of the predictive model. At the end of the training phase, the predictive model generated by the neural network training engine 411 includes the number of layers, the number of neurons per layer, and the weights. However, the number of neurons for the input and output layers shall not be changed.

Although not represented in FIG. 7 for simplification purposes, the modifications to the weights of the neural network performed at step 620 are stored in the memory 420 of the training server 400.

Figure 8:
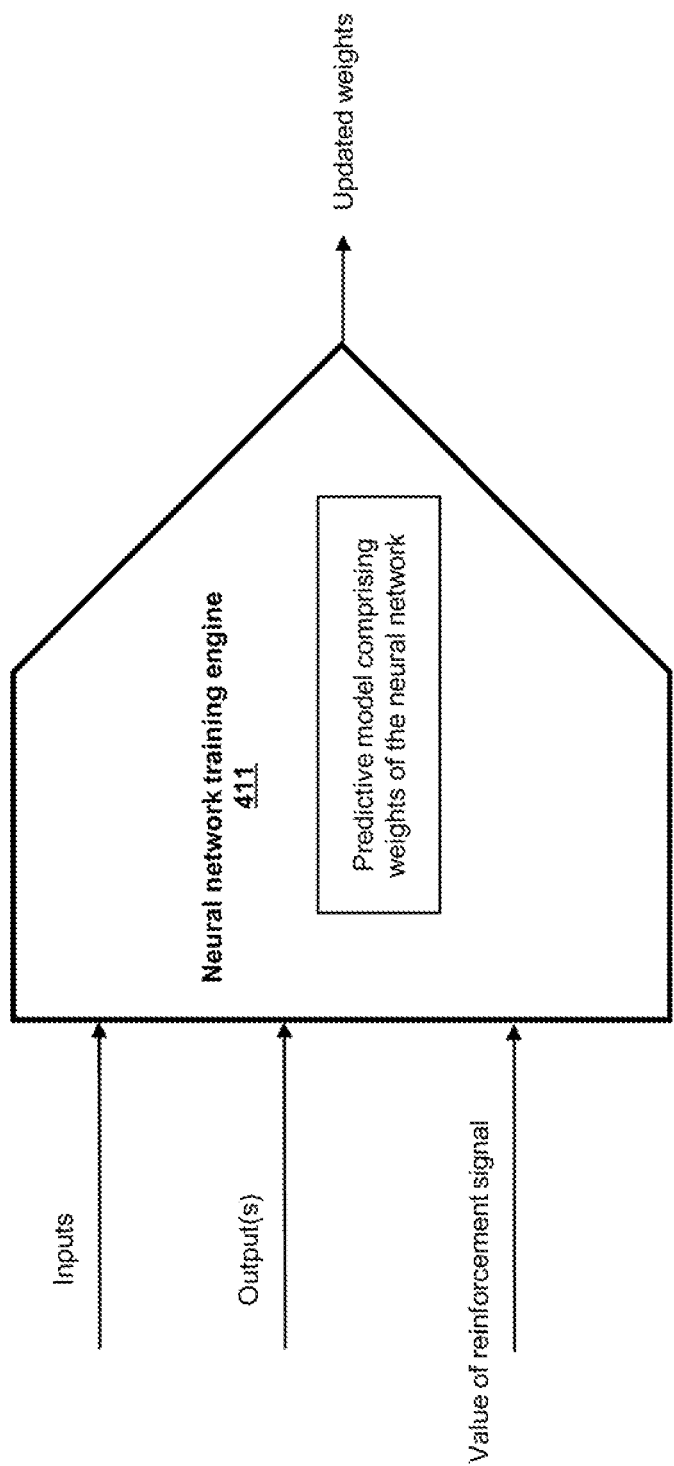
FIG. 8 is a schematic representation of a neural network training engine executed by the training server of FIG. 6 according to the method of FIG. 7.

FIG. 8 is a schematic representation of the neural network training engine 411 illustrating the inputs, the one or more output and the value of the reinforcement signal used by the neural network inference engine 411 when performing step 620.

Optionally, as illustrated in FIG. 7, several iterations of steps 610-615-620 are repeated if a plurality of batches of training data sets are received at step 610. The execution of steps 610-615-620 is implementation dependent. In a first exemplary implementation, as soon as the training server 400 receives training data set(s) from a given environment controller 100 at step 610, steps 615 and 620 are immediately performed. In a second exemplary implementation, the training server 400 waits for the reception of a substantial amount of training data sets from environment controller(s) 100 at step 610, before performing steps 615 and 620. In this second implementation, the received training data steps are stored in the memory 420 before being used. Furthermore, some of the received training data sets may be discarded by the training server 400 (e.g. a training data set is redundant with another already received training data set, at least some of the data contained in the training data set are considered erroneous or non-usable, etc.).

At the end of the training phase implemented by steps 610-615-620, the neural network is considered to be properly trained, and an updated predictive model comprising a final version of the updated weights is transmitted to the environment controllers 100, as illustrated in FIG. 6. Various criteria may be used to determine when the neural network is considered to be properly trained, as is well known in the art of neural networks. This determination and the associated criteria is out of the scope of the present disclosure.

The method 600 comprises the step 625 of transmitting an update of the predictive model (originally stored at step 605) comprising the updated weights (updated by the repetition of step 620) to the plurality of environment controllers 100 via the communication interface 430. Step 625 is performed by the control module 414 executed by the processing unit 410. The update of the predictive model of the neural network generally only involves an update of the weights (the number of layers of the neural network and the number of neurons per layer are generally unchanged). Step 625 corresponds to step 570 of the method 500 executed by the environment controllers 100.

From this point on, the environment controllers 100 enter an operational mode, where the updated predictive model is used for managing the environment (generating command(s) for controlling the controlled appliances 300) of the respective areas under the control of the environment controllers 100.

During the execution of the method 600 for improving the initial predictive model, only a few environment controllers 100 may be operating in a training mode, for the sole purpose of providing the training data sets used by the training server 400 when executing the method 600. Once the updated predictive model is available at the end of the training phase, it can be distributed to a larger number of environment controllers 100 entering the operational mode. Additionally, the methods 500 and 600 can be used to further improve the updated predictive model used in the operational mode, as described previously.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller comprising:
at least one communication interface;
memory for storing a predictive model comprising weights of a neural network; and
a processing unit comprising one or more processor configured to:
(a) determine at least one environmental characteristic value in an area;
(b) receive at least one set point via one of the at least one communication interface or a user interface of the environment controller;
(c) execute a neural network inference engine using the predictive model for generating one or more output based on inputs, the one or more output comprising one or more command for controlling a controlled appliance, the inputs comprising the at least one environmental characteristic value in the area and the at least one set point;
(d) modify the one or more command;
(e) transmit the one or more modified command to the controlled appliance via the at least one communication interface;
(f) generate at least one metric representative of an execution of the one or more modified command by the controlled appliance;
(g) transmit the inputs, the one or more output and the at least one metric to a training server via the at least one communication interface; and
(h) receive an update of the predictive model comprising updated weights from the training server via the at least one communication interface.

2. The environment controller of claim 1, wherein steps (a) to (g) are repeated a plurality of times before the occurrence of step (h).

3. The environment controller of claim 1, wherein modifying the one or more command comprises applying a random modification to the one or more command.

4. The environment controller of claim 1, wherein modifying the one or more command comprises applying a modification selected among a set of one or more predefined modification to the one or more command.

5. The environment controller of claim 1, wherein the modification of the one or more command is performed based on configuration data included in a configuration message received via the at least one communication interface.

6. The environment controller of claim 1, wherein the at least one metric comprises at least one updated environmental characteristic value in the area determined by the processing unit after the transmission of the one or more modified command to the controlled appliance.

7. The environment controller of claim 1, wherein the at least one metric comprises at least one measurement by the processing unit of a time required for reaching at least one corresponding environmental state in the area after the transmission of the one or more modified command to the controlled appliance.

8. The environment controller of claim 1, wherein the at least one environmental characteristic value in the area comprises at least one of the following: a current temperature in the area, a current humidity level in the area, a current carbon dioxide ($CO_2$) level in the area, and a current occupancy of the area.

9. The environment controller of claim 1, wherein the at least one environmental characteristic value in the area comprises at least one of the following: a plurality of consecutive temperature measurements in the area, a plurality of consecutive humidity level measurements in the area, a plurality of consecutive carbon dioxide ($CO_2$) level measurements in the area, and a plurality of consecutive determinations of an occupancy of the area.

10. The environment controller of claim 1, wherein determining the environmental characteristic value in the area consists in receiving the environmental characteristic value from a sensor via the at least one communication interface.

11. The environment controller of claim 1, wherein the at least one set point comprises at least one of the following: a target temperature, a target humidity level, and a target $CO_2$ level.

12. The environment controller of claim 1, wherein the one or more processor is further configured to determine at least one characteristic of the area; and the inputs further include the at least one characteristic of the area.

13. The environment controller of claim 12, wherein the at least one characteristic of the area comprises at least one of the following: an area type identifier selected among a plurality of area type identifiers, one or more geometric characteristics of the area, and a human activity in the area.

14. The environment controller of claim 1, wherein the area is a room inside a building.

15. The environment controller of claim 1, wherein the controlled appliance consists of a Variable Air Volume (VAV) appliance.

16. The environment controller of claim 1, wherein the one or more command includes at least one of the following: a command for controlling a speed of a fan, a command for controlling a pressure generated by a compressor, and a command for controlling a rate of an airflow through a valve.

17. The environment controller of claim 1, wherein the neural network inference engine implements the neural network corresponding to the predictive model, the neural network comprising an input layer for receiving the inputs, followed by one or more intermediate hidden layers, followed by an output layer for outputting the one or more output.

18. A method for improving a predictive model of a neural network used for performing environment control, the method comprising:
  storing in a memory of a computing device a predictive model comprising weights of a neural network;
  (a) determining by a processing unit of the computing device at least one environmental characteristic value in an area;
  (b) receiving at least one set point via one of a communication interface of the computing device or a user interface of the computing device;
  (c) executing by the processing unit of the computing device a neural network inference engine using the predictive model for generating one or more output based on inputs, the one or more output comprising one or more command for controlling a controlled appliance, the inputs comprising the at least one environmental characteristic value in the area and the at least one set point;
  (d) modifying by the processing unit of the computing device the one or more command;
  (e) transmitting the one or more modified command to the controlled appliance via the communication interface of the computing device;
  (f) generating by the processing unit of the computing device at least one metric representative of an execution of the one or more modified command by the controlled appliance;
  (g) transmitting the inputs, the one or more output and the at least one metric to a training server via the communication interface; and
  (h) receiving an update of the predictive model comprising updated weights from the training server via the communication interface.

19. The method of claim 18, wherein the computing device is an environment controller.

20. The method of claim 18, wherein steps (a) to (g) are repeated a plurality of times before the occurrence of step (h).

21. The method of claim 18, wherein modifying the one or more command comprises applying a random modification to the one or more command.

22. The method of claim 18, wherein modifying the one or more command comprises applying a modification selected among a set of one or more pre-defined modification to the one or more command.

23. The method of claim 18, wherein the modification of the one or more command is performed based on configuration data included in a configuration message received via the communication interface.

24. The method of claim 18, wherein the at least one metric comprises at least one updated environmental characteristic value in the area determined by the processing unit after the transmission of the one or more modified command to the controlled appliance.

25. The method of claim 18, wherein the at least one metric comprises at least one measurement by the processing unit of the computing device of a time required for reaching at least one corresponding environmental state in the area after the transmission of the one or more modified command to the controlled appliance.

26. The method of claim 18, wherein the at least one environmental characteristic value in the area comprises at least one of the following: a current temperature in the area, a current humidity level in the area, a current carbon dioxide ($CO_2$) level in the area, and a current occupancy of the area.

27. The method of claim 18, wherein the at least one environmental characteristic value in the area comprises at least one of the following: a plurality of consecutive temperature measurements in the area, a plurality of consecutive humidity level measurements in the area, a plurality of consecutive carbon dioxide ($CO_2$) level measurements in the area, and a plurality of consecutive determinations of an occupancy of the area.

28. The method of claim 18, wherein determining the environmental characteristic value in the area consists in receiving the environmental characteristic value from a sensor via the communication interface.

29. The method of claim 18, wherein the at least one set point comprises at least one of the following: a target temperature, a target humidity level, and a target $CO_2$ level.

30. The method of claim 18, further comprising determining by the processing unit of the computing device at least one characteristic of the area; and the inputs further include the at least one characteristic of the area.

31. The method of claim 30, wherein the at least one characteristic of the area comprises at least one of the following: an area type identifier selected among a plurality of area type identifiers, one or more geometric characteristics of the area, and a human activity in the area.

32. The method of claim 18, wherein the area is a room inside a building.

33. The method of claim 18, wherein the controlled appliance consists of a Variable Air Volume (VAV) appliance.

34. The method of claim 18, wherein the one or more command includes at least one of the following: a command for controlling a speed of a fan, a command for controlling a pressure generated by a compressor, and a command for controlling a rate of an airflow through a valve.

35. The method of claim 18, wherein the neural network inference engine implements the neural network corresponding to the predictive model, the neural network comprising an input layer for receiving the inputs, followed by one or more intermediate hidden layers, followed by an output layer for outputting the one or more output.

36. A non-transitory computer program product comprising instructions executable by a processing unit of a computing device, the execution of the instructions by the processing unit of the computing device providing for improving a predictive model of a neural network used for performing environment control by:

storing in a memory of the computing device a predictive model comprising weights of a neural network;

(a) determining at least one environmental characteristic value in an area;

(b) receiving at least one set point via one of a communication interface of the computing device or a user interface of the computing device;

(c) executing a neural network inference engine using the predictive model for generating one or more output based on inputs, the one or more output comprising one or more command for controlling a controlled appliance, the inputs comprising the at least one environmental characteristic value in the area and the at least one set point;

(d) modifying the one or more command;

(e) transmitting the one or more modified command to the controlled appliance via the communication interface of the computing device;

(f) generating at least one metric representative of an execution of the one or more modified command by the controlled appliance;

(g) transmitting the inputs, the one or more output and the at least one metric to a training server via the communication interface; and (h) receiving an update of the predictive model comprising updated weights from the training server via the communication interface.

* * * * *